(12) United States Patent
Sawadaishi et al.

(10) Patent No.: US 9,237,319 B2
(45) Date of Patent: Jan. 12, 2016

(54) IMAGING DEVICE AND AUTOMATIC FOCUS ADJUSTMENT METHOD

(71) Applicant: FUJIFILM Corporation, Tokyo (JP)

(72) Inventors: Arito Sawadaishi, Saitama (JP); Shu Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/560,373

(22) Filed: Dec. 4, 2014

(65) Prior Publication Data

US 2015/0146052 A1    May 28, 2015

Related U.S. Application Data

(63) Continuation of application No. PCT/JP2013/061840, filed on Apr. 23, 2013.

(30) Foreign Application Priority Data

Jun. 19, 2012  (JP) ................................ 2012-137774

(51) Int. Cl.
| | |
|---|---|
| *H04N 9/07* | (2006.01) |
| *G02B 7/34* | (2006.01) |
| *G03B 13/36* | (2006.01) |
| *H04N 5/232* | (2006.01) |

(Continued)

(52) U.S. Cl.
CPC .. *H04N 9/07* (2013.01); *G02B 7/34* (2013.01); *G03B 13/36* (2013.01); *H04N 5/23212* (2013.01); *H04N 5/3696* (2013.01); *H04N 9/045* (2013.01); *H04N 2209/045* (2013.01)

(58) Field of Classification Search
CPC ....... H04N 9/07; H04N 9/045; H04N 5/3696; H04N 5/23212; H04N 2209/045; G02B 7/34; G03B 13/36
See application file for complete search history.

(56) References Cited

U.S. PATENT DOCUMENTS

| | | | |
|---|---|---|---|
| 5,889,554 A | 3/1999 | Mutze | |
| 2009/0153705 A1* | 6/2009 | Katsuda | ................. H04N 9/045 348/273 |

(Continued)

FOREIGN PATENT DOCUMENTS

| | | |
|---|---|---|
| EP | 1793620 A1 | 6/2007 |
| JP | 2-210995 A | 8/1990 |

(Continued)

OTHER PUBLICATIONS

International Search Report, issued in PCT/JP2013/061640, dated Jul. 30, 2013.

(Continued)

*Primary Examiner* — Twyler Haskins
*Assistant Examiner* — Peter Chon
(74) *Attorney, Agent, or Firm* — Birch, Stewart, Kolasch & Birch, LLP

(57) ABSTRACT

The present invention utilizes color mixings with angle dependencies from adjacent R pixels, and in the case where a subject color is red, uses first and second B pixels as phase-difference pixels, allowing for an accurate phase-difference AF based on the output signals of the first and second B pixels. Here, it is unnecessary to provide phase-difference pixels dedicated to the case where the subject color is red, and the phase difference is detected using ordinary B pixels of an imaging element. Therefore, the resolution is not sacrificed.

18 Claims, 15 Drawing Sheets

(51) Int. Cl.
*H04N 5/369* (2011.01)
*H04N 9/04* (2006.01)

(56) References Cited

U.S. PATENT DOCUMENTS

| | | | |
|---|---|---|---|
| 2009/0200451 A1 | 8/2009 | Conners | |
| 2010/0214452 A1* | 8/2010 | Kawarada | G02B 7/346 348/255 |
| 2011/0273599 A1* | 11/2011 | Murata | G02B 7/36 348/294 |
| 2014/0334683 A1* | 11/2014 | Masuda | H04N 5/23212 382/103 |

FOREIGN PATENT DOCUMENTS

| | | |
|---|---|---|
| JP | 2009-122524 A | 5/2009 |
| JP | 2011-257565 A | 12/2011 |
| JP | 2012-4729 A | 1/2012 |
| JP | 2012-22147 A | 2/2012 |
| JP | 2012-114797 A | 6/2012 |

OTHER PUBLICATIONS

Written Opinion of the International Searching Authority, issued in PCT/JP2013/061840, dated Jul. 30, 2013.
Extended European Search Report dated Aug. 4, 2014, for European Application No. 11859479.5.
Extended European Search Report dated Jan. 27, 2015, for European Application No. 12804973.1.
Extended European Search Report dated Oct. 28, 2014, for European Application No. 11859950.5.
Hirakawa et al., "Spatio-Spectral Color Filter Array Design for Optimal Image Recovery", IEEE Transactions on Image Processing, vol. 17, No. 10, Oct. 2008, pp. 1876-1890.

* cited by examiner

A ARRAY    B ARRAY

IMAGING DEVICE AND AUTOMATIC FOCUS ADJUSTMENT METHOD

CROSS-REFERENCE TO RELATED APPLICATIONS

This application is a Continuation of PCT International Application No. PCT/JP2013/061840 filed on Apr. 23, 2013, which claims priority under 35 U.S.C. §119(a) to Japanese Patent Application No. 2012-137774 filed on Jun. 19, 2012. Each of the above application(s) is hereby expressly incorporated by reference, in its entirety, into the present application.

BACKGROUND OF THE INVENTION

1. Field of the Invention

The present invention relates to an imaging device and an automatic focus adjustment method, and particularly to an imaging device and an automatic focus adjustment method for detecting a phase difference between imaged signals and automatically performing a focus adjustment.

2. Description of the Related Art

Conventionally, there is known an automatic focus adjustment (phase difference AF) in which first and second phase-difference pixels are provided in parts of an imaging element, a phase difference between the output signals of the first and second phase-difference pixels is detected, and the focal position of a focus lens is adjusted based on the detected phase difference.

When the first and second phase-difference pixels are provided in parts of the imaging element, there is a problem in that the focus detection accuracy decreases by the influence of a crosstalk from other pixels with different colors that are adjacent to the first and second phase-difference pixels.

For solving this problem, a focus detection device described in Japanese Patent Application Laid-Open No. 2009-122524 corrects the output signals of the first and second phase-difference pixels, depending on the output signals of surrounding pixels, and detects the phase difference based on the signals after the correction.

Meanwhile, the saturation of pixels adjacent to the phase-difference pixels creates another problem in that the crosstalk correction is not properly performed and an error appears in the focus detection result.

For solving this problem, an imaging device described in Japanese Patent Application Laid-Open No. 2011-257565 decides whether pixels surrounding the phase-difference pixels are saturated, and switches the crosstalk correction depending on the decision result.

SUMMARY OF THE INVENTION

The phase-difference pixel described in Japanese Patent Application Laid-Open No. 2009-122524 is a white pixel having such a spectral sensitivity characteristic that the spectral sensitivity characteristics of the respective pixels of RGB are summed, and the phase-difference pixel described in Japanese Patent Application Laid-Open No. 2011-257565 is a G pixel. In the case of an extremely red subject or a low color temperature, there is a problem in that it is impossible to obtain a signal output necessary for accurately detecting the phase difference and to perform an accurate phase difference AF, even if the crosstalk to the output signal of the phase-difference pixel is corrected.

Further, both of the imaging elements described in Japanese Patent Application Laid-Open No. 2009-122524 and Japanese Patent Application Laid-Open No. 2011-257565 have color filters in the so-called Bayer array, in which, of red (R), green (G) and blue (B) pixels, the G pixels are arranged in a checkered pattern, and the R pixels and the B pixels are arranged alternately and line-sequentially. The R pixels and the B pixels are not provided in a manner in which they are adjacent at the minimum pitch, and the mixing (crosstalk) of electric charges, which is called the color mixing, does not occur between the R pixels and the B pixels.

The present invention, which has been made in view of such circumstances, has an object to provide an imaging device and an automatic focus adjustment method that make it possible to accurately perform the phase-difference AF, even in the case of an extremely red subject or a low color temperature.

For achieving the above object, an imaging device according to an aspect of the present invention includes: an image-taking lens; an imaging element including at least red (R), green (G) and blue (B) pixels, and first and second phase-difference pixels on which subject images having passed through first and second regions are pupil-divided and are formed respectively, and having a first B pixel and a second B pixel, the first and second regions being different regions on the image-taking lens, the first B pixel being adjacent in a first direction to a first R pixel of the R pixels at a minimum pitch, the second B pixel being adjacent in a second direction to a second R pixel of the R pixels, the second direction being opposite to the first direction; a decision unit to decide whether a subject color in a focus detection region is a red color, based on an output signal of the focus detection region, the focus detection region being set in the imaging element; a phase-difference detection unit to detect a phase difference between respective output signals of the first and second phase-difference pixels in the focus detection region, based on the respective output signals, when the decision unit decides that the subject color in the focus detection region is not a red color, and to detect a phase difference between respective output signals of the first and second B pixels in the focus detection region, based on the respective output signals, when the decision unit decides that the subject color in the focus detection region is a red color; and a focus adjustment unit to adjust a focal position of the image-taking lens, based on the phase difference detected by the phase-difference detection unit.

The imaging element according to an aspect of the present invention includes the R pixel, the G pixel, the B pixel, and the first and second phase-difference pixels, and has the B pixels (the first and second B pixels) that are adjacent in the first and second directions to the first and second R pixels at the minimum pitch, respectively. Whether the subject color in the focus detection region previously set in the imaging element is a red color is decided, and when the decision that the subject color is not a red color is made, the phase difference is detected based on the respective output signals of the first and second phase-difference pixels in the focus detection region. On the other hand, when the decision that the subject color in the focus detection region is a red color is made, the phase difference is detected based on the respective output signals of the first and second B pixels in the focus detection region.

In the case of an extremely red subject or a low color temperature (in the case where the reflected color of a subject is biased to long wavelengths), the color mixings with angle dependencies from R pixels and the angle dependencies of the first and second phase-difference pixels themselves are mixed, and it is impossible to accurately perform the phase-difference AF based on the output signals of the first and second phase-difference pixels. On the other hand, as for the first and second B pixels, in the case of an extremely red subject or a low color temperature, the color mixings with angle dependencies from adjacent R pixels increase. Particularly, in the case where the subject color is red, the color mixing components from the R pixels increase, and the color mixing components sometimes exceed the original outputs of the pixels. The present invention utilizes the color mixings with angle dependencies from the adjacent R pixels, and in the case where the subject color is red, uses the first and second B pixels as the phase-difference pixels, allowing for an accurate phase-difference AF based on the output signals of the first and second B pixels. Here, it is unnecessary to provide phase-difference pixels dedicated to the case where the subject color is red, and the phase difference is detected using ordinary B pixels of the imaging element. Therefore, the resolution is not sacrificed.

In an imaging device according to an alternative aspect of the present invention, it is preferable that the decision unit calculate a ratio between an integrated value of output signals of R pixels and an integrated value of output signals of G pixels in a previously set focus detection region of the imaging element, and decide that the subject color in the focus detection region is a red color, by comparing the calculated ratio with a previously set threshold value.

In the case where the subject color is red, the outputs of the G pixels are reduced compared to the outputs of the R pixels. As a result, the ratio between the integrated value of the output signals of the R pixels and the integrated value of the output signals of the G pixels greatly changes. Therefore, by comparing the ratio and the previously set threshold value, it is possible to decide whether the subject color in the focus detection region is a red color. Here, it is possible that a ratio when the accuracy of the phase difference AF by the output signals of the first and second B pixels gets to be higher than the phase difference AF by the output signals of the first and second phase-difference pixels is determined by a test or the like, and the ratio on this occasion is adopted as the threshold value.

In an imaging device according to a further alternative aspect of the present invention, it is preferable that each of the first and second phase-difference pixels be a pixel on which a filter of G or a colorless filter is arranged. This is because the output signal of the pixel on which a filter of G or a colorless filter is arranged contributes to the luminance signal compared to the output signal of pixels of the other colors, and is suitable for the phase difference AF.

In an imaging device according to a further alternative aspect of the present invention, it is preferable that the first B pixel and the second B pixel be alternately arrayed on a single line that is in the first direction, and the phase-difference detection unit detect a first phase difference, based on the output signal of the first B pixel arrayed on a first line that is in the first direction, and the output signal of the second B pixel provided on a second line that is close to the first line, detect a second phase difference, based on the output signal of the second B pixel arrayed on the first line that is in the first direction, and the output signal of the first B pixel provided on the second line, and detect the phase difference by averaging the detected first and second phase differences. Thereby, even if the first and second B pixels on the first line and the first and second B pixels on the second line are relatively deviated, the phase difference can be detected without being influenced.

In an imaging device according to a further alternative aspect of the present invention, it is preferable that the first phase-difference pixel and the second phase-difference pixel be alternately arrayed on a single line that is in the first direction, and the phase-difference detection unit detect a third phase difference, based on the output signal of the first phase-difference pixel arrayed on a third line that is in the first direction, and the output signal of the second phase-difference pixel provided on a fourth line that is close to the third line, detect a fourth phase difference, based on the output signal of the second phase-difference pixel arrayed on the third line that is in the first direction, and the output signal of the first phase-difference pixel provided on the fourth line, and detect the phase difference by averaging the detected third and fourth phase differences. Thereby, even if the first and second phase-difference pixels on the third line and the first and second phase-difference pixels on the fourth line are relatively deviated, the phase difference can be detected without being influenced.

In an imaging device according to a further alternative aspect of the present invention, it is preferable that the imaging device include: a rolling reading unit to sequentially read signals for each line of the imaging element; and a mechanical shutter to block light that enters the imaging element, in which the phase-difference detection unit continuously detects the phase difference, based on signals that the rolling reading unit continuously reads in a state in which the mechanical shutter is opened. Thereby, even if a mechanical shutter is not used, the phase difference can be detected without being influenced by the rolling reading. Particularly, it is possible to perform the phase-difference AF for a moving image, and also, to speed up the phase-difference AF for a still image.

In an imaging device according to an alternative aspect of the present invention, it is preferable that the imaging device include a defocus amount calculation unit to determine a defocus amount of the image-taking lens, based on the phase difference detected by the phase difference detection unit, and a rate of color mixing from a peripheral pixel to at least one phase-difference pixel of the first and second phase-difference pixels, in which the focus adjustment unit moves the image-taking lens to such a position that the defocus amount determined by the defocus amount calculation unit is zero. The defocus amount calculation unit may correct, by the rate of the color mixing, a relational expression indicating the relation between the phase difference and the defocus amount in the case of no color mixing, to determine the defocus amount by the detected phase difference and the corrected relational expression, or may have a table indicating the relation between the phase difference and the defocus amount, for each rate of the color mixing, to read a corresponding defocus amount from the table, based on the detected phase difference and the rate of the color mixing.

In an imaging device according to an alternative aspect of the present invention, it is preferable that the phase-difference detection unit correct the output signal of at least one phase-difference pixel of the first and second phase-difference pixels, based on a rate of color mixing from a peripheral pixel to the at least one phase-difference pixel of the first and second phase-difference pixels, and an output signal of the peripheral pixel, and detect the phase difference, based on the output signals of the first and second phase-difference pixels after the correction. In the case where the subject color is not extremely red, the phase difference is detected based on the output signals of the first and second phase-difference pixels. However, even in this case, the at least one phase-difference pixel of the first and second phase-difference pixels is influenced by the color mixing from the peripheral pixel. Hence, the correction for removing the color mixing component is performed to the output signal of the at least phase-difference pixel of the first and second phase-difference pixels, and the phase difference is detected based on the output signals of the first and second phase-difference pixels after the correction.

In an imaging device according to an alternative aspect of the present invention, an R pixel is arranged so as to be adjacent in the first direction to the at least one phase-difference pixel of the first and second phase-difference pixels, and the rate of the color mixing from the peripheral pixel is a rate of color mixing from the R pixel to the phase-difference pixel to which the R pixel is arranged so as to be adjacent in the first direction.

In an imaging device according to a further alternative aspect of the present invention, it is preferable that the phase-difference detection unit determine the rate of the color mixing based on a ratio between the output signal of the first B pixel and the output signal of the second B pixel.

In an imaging device according to a further alternative aspect of the present invention, it is preferable that the imaging element have the first and second B pixels in the first and second directions, and have the first and second B pixels in third and fourth directions perpendicular to the first and second directions, and the phase-difference detection unit detect the phase difference, based on the output signals of the first and second B pixels in the first and second directions or the first and second B pixels in the third and fourth directions.

In an imaging device according to a further alternative aspect of the present invention, it is preferable that the first and second directions be left-right directions when a body of the imaging device is horizontally held, the imaging device include a longitudinal/lateral image-taking detection unit to detect whether an image-taking is a lateral image-taking or a longitudinal image-taking, and the phase-difference detection unit detect the phase difference based on the output signals of the first and second B pixels in the first and second directions, when the lateral image-taking is detected by the longitudinal/lateral image-taking detection unit, and detect the phase difference based on the output signals of the first and second B pixels in the third and fourth directions, when the longitudinal image-taking is detected by the longitudinal/lateral image-taking detection unit.

The first and second B pixels are arranged across the whole region of the imaging element, and are present in the first and second directions and in the third and fourth directions perpendicular to the first and second directions. Depending on whether the image-taking is the lateral image-taking or the longitudinal image-taking, the phase difference is detected based on the output signals of the first and second B pixels in the first and second directions, or the output signals of the first and second B pixels in the third and fourth directions. Thereby, regardless of whether the image-taking is the lateral image-taking or the longitudinal image-taking, the phase-difference AF can be performed at the same accuracy.

In an imaging device according to a further alternative aspect of the present invention, it is preferable that the imaging element have at least one basic array pattern of color filters, the basic array pattern corresponding to 6×6 pixels in the first and second directions and in third and fourth directions perpendicular to the first and second directions and being repetitively provided in the first and second directions and in the third and fourth directions, the basic array pattern be configured such that a first array and a second array are arranged at diagonal positions to each other, the first array being an array that corresponds to 3×3 pixels and in which G filters are arranged at the center and the four corners, B filters are arranged at the top and bottom to the G filter at the center, and R filters are arranged at the left and right thereto, the second array being an array that corresponds to 3×3 pixels and in which G filters are arranged at the center and the four corners, R filters are arranged at the top and bottom to the G filter at the center, and B filters are arranged at the left and right thereto, and a pixel having the G filter at one of the four corners of the first or second array in the focus detection region of the imaging element be configured as the first or second phase-difference pixel. The first and second phase-difference pixels may be arranged in the whole region of the imaging element, or may be arranged only in a particular region. Here, also in the case where the first and second phase-difference pixels are arranged in the whole region of the imaging element, the focus detection region is set at an arbitrary position in the whole region, and the output signals of the first and second phase-difference pixels in the set focus detection region are used for the detection of the phase difference.

An imaging device according to a further alternative aspect of the present invention includes: an image-taking lens; an imaging element including at least red (R), green (G) and blue (B) pixels, and first and second phase-difference pixels on which subject images having passed through first and second regions are pupil-divided and are formed respectively, and having a first B pixel and a second B pixel, the first and second regions being different regions on the image-taking lens, the first B pixel being adjacent in a first direction to a first R pixel of the R pixels at a minimum pitch, the second B pixel being adjacent in a second direction to a second R pixel of the R pixels, the second direction being opposite to the first direction, the imaging element arranging an R pixel such that the R pixel is adjacent in the first direction or the second direction to at least one phase-difference pixel of the first and second phase-difference pixels; a phase-difference detection unit to detect a phase difference between respective output signals of the first and second phase-difference pixels in a focus detection region, based on the respective output signals, the focus detection region being set in the imaging element; and a focus adjustment unit to adjust a focal position of the image-taking lens, based in the phase difference output by the phase-difference detection unit, in which the phase-difference detection unit determines a rate of color mixing from a peripheral pixel to the at least one phase-difference pixel of the first and second phase-difference pixels, based on at least one output signal of an output signal of the first B pixel and an output signal of the second B pixel, and corrects the output signal of the at least one phase-difference pixel of the first and second phase-difference pixels, based on the determined rate of the color mixing and an output signal of the peripheral pixel.

In an imaging device according to a further alternative aspect of the present invention, it is preferable that the imaging device include a decision unit to decide whether a subject color in the focus detection region is a red color, based on an output signal of the focus detection region, in which the phase-difference detection unit determines the rate of the color mixing from the peripheral pixel, from the at least one output signal of the output signal of the first B pixel and the output signal of the second B pixel, when the decision unit decides that the subject color in the focus detection region is a red color, corrects the output signal of the at least one phase-difference pixel of the first and second phase-difference pixels, based on the rate of the color mixing and the output signal of the peripheral pixel, and detects the phase difference, based on the output signals of the first and second phase-difference pixels after the correction.

An imaging device according to a further alternative aspect of the present invention includes: an image-taking lens; an imaging element including at least red (R), green (G) and blue (B) pixels, and first and second phase-difference pixels on which subject images having passed through first and second regions are pupil-divided and are formed respectively, and having a first B pixel and a second B pixel, the first and second regions being different regions on the image-taking lens, the first B pixel being adjacent in a first direction to a first R pixel of the R pixels at a minimum pitch, the second B pixel being adjacent in a second direction to a second R pixel of the R pixels, the second direction being opposite to the first direction, the imaging element arranging an R pixel such that the R pixel is adjacent in the first direction or the second direction to at least one phase-difference pixel of the first and second phase-difference pixels; a phase-difference detection unit to detect a phase difference between respective output signals of the first and second phase-difference pixels in a focus detection region, based on the respective output signals, the focus detection region being set in the imaging element; a defocus amount calculation unit to determine a defocus amount of the image-taking lens, based on the phase difference detected by the phase difference detection unit, and a rate of color mixing from a peripheral pixel to the at least one phase-difference pixel of the first and second phase-difference pixels; and a focus adjustment unit to move the image-taking lens to such a position that the defocus amount determined by the defocus amount calculation unit is zero, in which the phase-difference detection unit determines the rate of the color mixing from the peripheral pixel, based on at least one output signal of the output signal of the first B pixel and the output signal of the second B pixel.

In an imaging device according to a further alternative aspect of the present invention, it is preferable that the imaging device include a decision unit to decide whether a subject color in the focus detection region is a red color, based on an output signal of the focus detection region, in which the phase-difference detection unit determines the rate of the color mixing from the peripheral pixel, from the at least one output signal of the output signal of the first B pixel and the output signal of the second B pixel, when the decision unit decides that the subject color in the focus detection region is a red color, and the defocus amount calculation unit determines the defocus amount of the image-taking lens, based on the phase difference detected by the phase-difference detection unit, and the rate of the color mixing from the peripheral pixel.

An automatic focus adjustment method according to a further alternative aspect of the present invention includes: a signal acquisition step of acquiring an output signal from an imaging element, the imaging element including at least red (R), green (G) and blue (B) pixels, and first and second phase-difference pixels on which subject images having passed through first and second regions are pupil-divided and are formed respectively, and having a first B pixel and a second B pixel, the first and second regions being different regions on an image-taking lens, the first B pixel being adjacent in a first direction to a first R pixel of the R pixels at a minimum pitch, the second B pixel being adjacent in a second direction to a second R pixel of the R pixels, the second direction being opposite to the first direction; a decision step of deciding whether a subject color in a focus detection region is a red color, based on an output signal of the focus detection region, the focus detection region being set in the imaging element, the output signal of the focus detection region being of the output signal acquired in the signal acquisition step; a phase-difference detection step of detecting a phase difference between respective output signals of the first and second phase-difference pixels in the focus detection region, based on the respective output signals, when a decision that the subject color in the focus detection region is not a red color is made in the decision step, and detecting a phase difference between respective output signals of the first and second B pixels in the focus detection region, based on the respective output signals, when a decision that the subject color in the focus detection region is a red color is made in the decision step; and a focus adjustment step of adjusting a focal position of the image-taking lens, based on the phase difference detected in the phase-difference detection step.

According to the present invention, even in the case of an extremely red subject or a low color temperature, it is possible to accurately perform the phase difference AF, using the output signals of ordinary B pixels.

BRIEF DESCRIPTION OF THE DRAWINGS

FIG. 15 is a diagram showing an alternative embodiment of a color filter array that is arranged on the imaging element.

FIG. 16 is a diagram showing a state in which a basic array pattern shown in FIG. 15 is divided into four sets of 3×3 pixels.

DETAILED DESCRIPTION OF THE EMBODIMENTS

Hereinafter, preferable embodiments of an imaging device and an automatic focus adjustment method according to the present invention are explained in detail, with reference to the accompanying drawings.

[Imaging Device]

Figure 1:
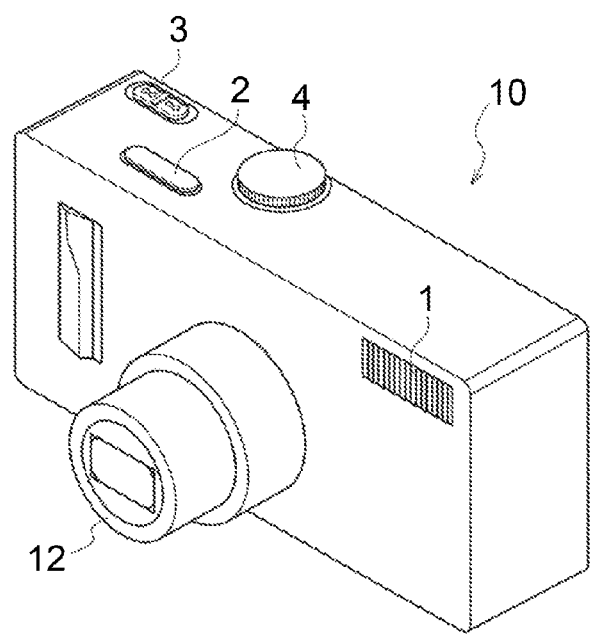
FIG. 1 is a perspective view showing an embodiment of an imaging device according to the present invention.
Figure 2:
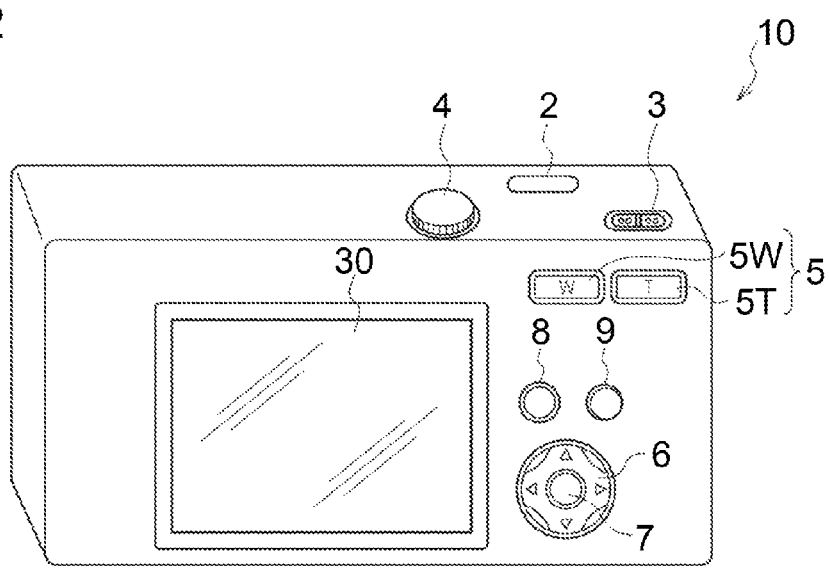
FIG. 2 is a back view of the imaging device shown in FIG. 1.

FIG. 1 and FIG. 2 are a perspective view and a back view showing an embodiment of an imaging device according to the present invention, respectively. This imaging device 10 is a digital camera that receives the light having passed through a lens with an imaging element, converts it into a digital signal, and records it in a recording medium.

As shown in FIG. 1, in the imaging device 10, an image-taking lens (image-taking optical system) 12, a strobe 1 and the like are provided on the front surface, and a shutter button 2, a power/mode switch 3, a mode dial 4 and the like are provided on the top surface. On the other hand, as shown in FIG. 2, a liquid crystal monitor 30 for 3D display, a zoom button 5, a cross button 6, a MENU/OK button 7, a playback button 8, a BACK button 9 and the like are provided on the back surface of the camera.

The image-taking lens 12, which is constituted by a collapsible zoom lens, extends from the camera body, when the mode of the camera is set to an image-taking mode by the power/mode switch 3. The strobe 1 emits strobe light toward a main subject.

The shutter button 2 is configured as a two-step stroke type switch that allows for a so-called "half-push" and "full-push". When the imaging device 10 is driven as the image-taking mode, the AE/AF is activated by performing the "half-push" of the shutter button 2, and an image taking is executed by performing the "full-push". Further, when the imaging device 10 is driven as the image-taking mode, an image taking is executed by performing the "full-push" of the shutter button 2.

The power/mode switch 3 has both of a function as a power switch for performing the ON/OFF of the power of the imaging device 10 and a function as a mode switch for setting the mode of the imaging device 10, and is provided so as to be able to slide among an "OFF position", a "playback position" and an "image-taking position". In the imaging device 10, when the power/mode switch 3 is slid and placed to the "playback position" or the "image-taking position", the power is turned on, and when it is placed to the "OFF position", the power is turned off. Then, when the power/mode switch 3 is slid and placed to the "playback position", the "playback mode" is set, and when it is placed to the "image-taking position", the "image-taking mode" is set.

The mode dial 4 functions as image-taking mode setting means for setting the image-taking mode of the imaging device 10, and, depending on the setting position of this mode dial, the image-taking mode of the imaging device 10 is set to various modes. For example, there are a "still image taking mode" for taking a still image, a "moving image taking mode" for taking a moving image, and the like.

The liquid crystal monitor 30 performs the display of a live view image (through image) at the time of the image-taking mode and the display of a still image or a moving image at the time of the playback mode, and therewith, functions as a part of a graphical user interface (GUI), for example, by performing the display of a menu screen.

The zoom button 5 functions as zoom instruction means for giving an instruction of the zoom, and includes a tele-button 5T for giving an instruction of the telescopic-side zoom and a wide-button 5W for giving an instruction of the wide-side zoom. In the imaging device 10, when the tele-button 5T and the wide-button 5W are operated in the image-taking mode, the focal length of the image-taking lens 12 is changed. Further, when the tele-button 5T and the wide-button 5W are operated in the playback mode, the playing image is magnified or demagnified.

The cross button 6 is an operation unit for inputting instructions for four directions: the upward direction, the downward direction, the leftward direction and the rightward direction, and functions as a button (cursor-movement operation means) for selecting an item from a menu screen, or for giving instructions of selections of various setting items from each menu. The left/right key functions as a frame advance (forward directional/backward directional advance) button in the playback mode.

The MENU/OK button 7 is an operation key having both of a function as a menu button for commanding the display of a menu on the screen of the liquid crystal monitor 30 and a function as an OK button for commanding the decision and execution of the selected content, or the like.

The playback button 8 is a button for the switching to the playback mode, in which a taken and recorded still image or moving image is displayed on the liquid crystal monitor 30.

The BACK button 9 functions as a button for giving an instruction of the cancel of an input operation or the restoration to the last operation state.

[Internal Configuration of Imaging Device]

Figure 3:
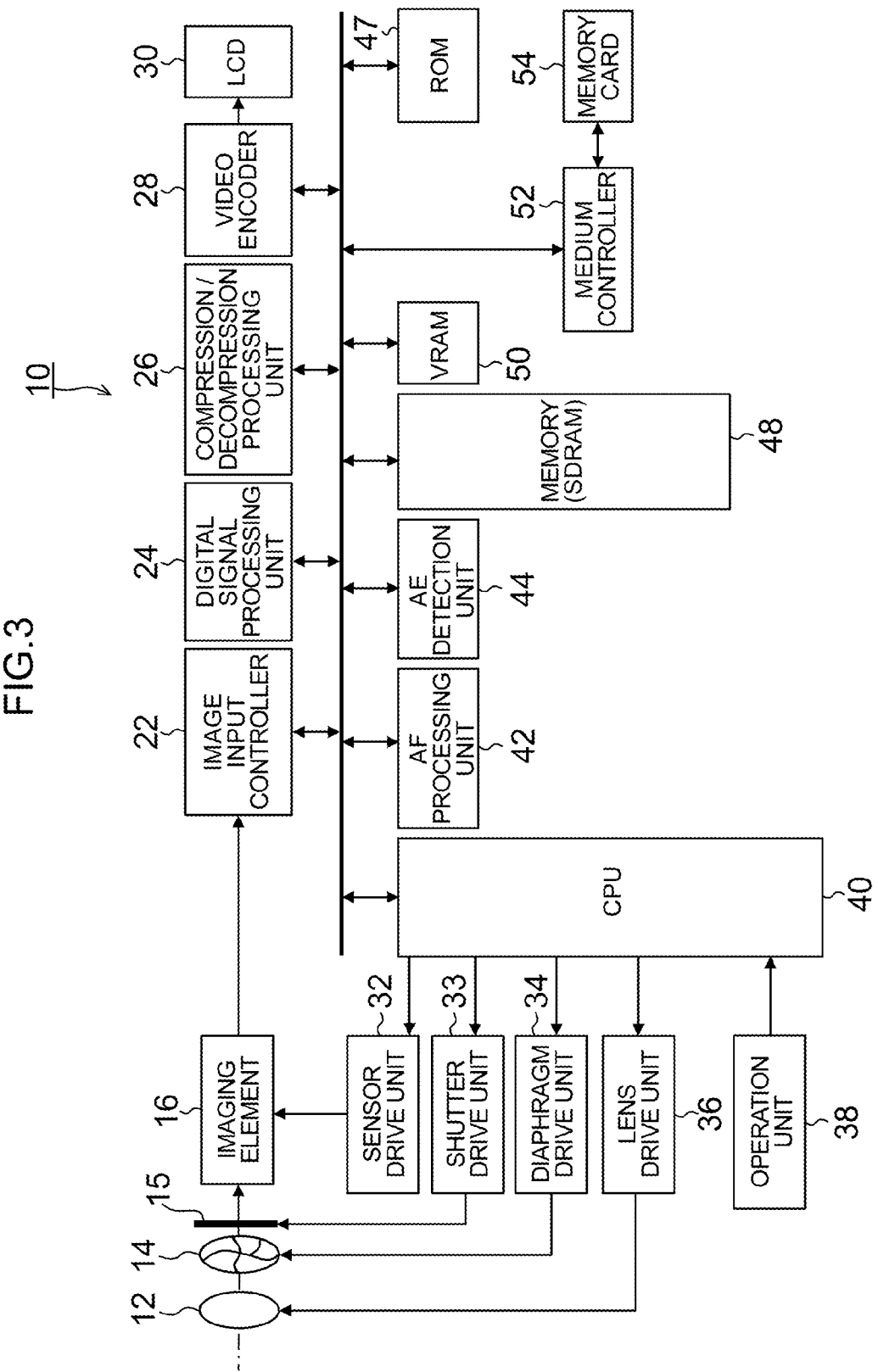
FIG. 3 is a block diagram showing an embodiment of the internal configuration of the imaging device shown in FIG. 1.

FIG. 3 is a block diagram showing an embodiment of the internal configuration of the above imaging device 10. The imaging device 10 records a picked-up image in a memory card 54, and the operation of the whole device is integrally controlled by a central processing unit (CPU) 40.

The imaging device 10 is provided with an operation unit 38 such as the shutter button, the mode dial, the playback button, the MENU/OK key, the cross key, the zoom button and the BACK key. A signal from the operation unit 38 is input to the CPU 40. Based on the input signal, the CPU 40 controls each circuit of the imaging device 10, and for example, performs the drive control of an image sensor, the lens drive control, the diaphragm drive control, the image-taking operation control, the image processing control, the recording/playing control of image data, the display control of the liquid crystal monitor 30, and the like.

When the power of the imaging device 10 is turned on by the power/mode switch 3, a power unit, which is not shown in the figure, supplies electricity to each block, and the drive of the imaging device 10 starts.

The light flux having passed through an image-taking lens 12, a diaphragm 14, a mecha-shutter (mechanical shutter) 15 and the like forms an image on an imaging element 16 that is a CMOS (Complementary Metal-Oxide Semiconductor) type color image sensor. Here, without being limited to the CMOS type, the imaging element 16 may be an XY address type or CCD (Charge Coupled Device) type color image sensor.

On the imaging element 16, many light receiving elements (photodiodes) are arrayed two-dimensionally. A subject image formed on the light receiving surface of each photodiode is converted into a signal voltage (or an electric charge) of a quantity corresponding to the incident light quantity, and is converted into a digital signal through an A/D converter in the imaging element 16, to be output.

<Embodiment of Imaging Element>

Figure 4:
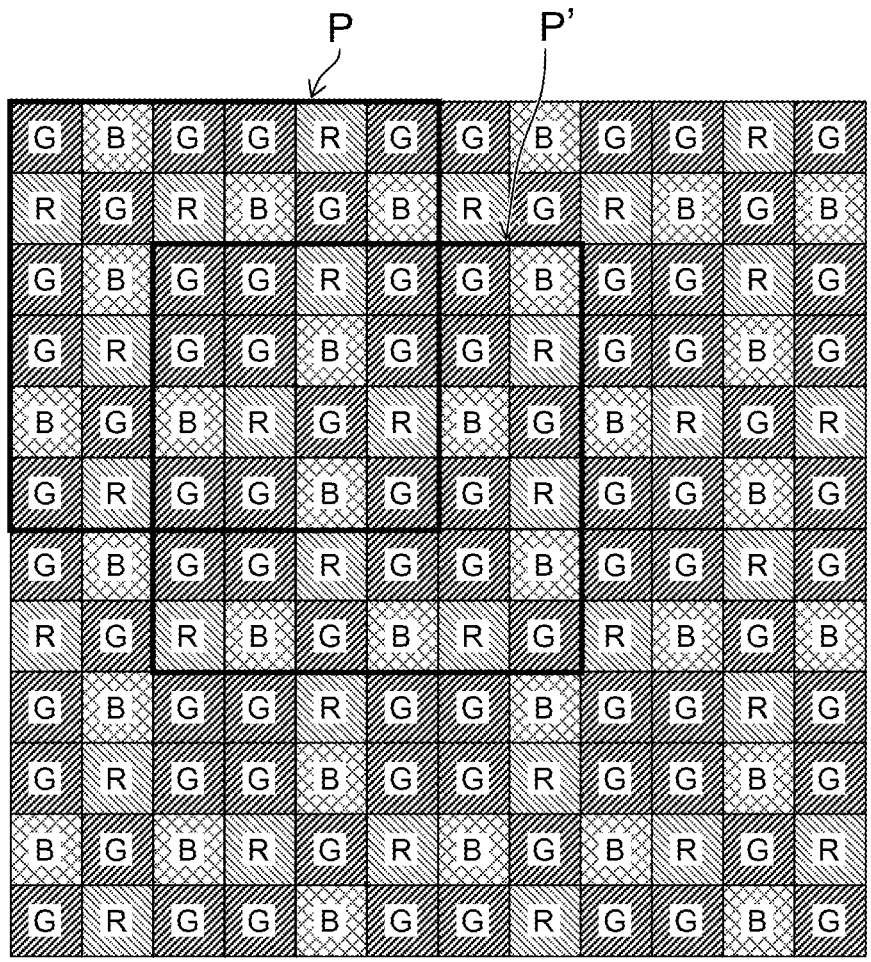
FIG. 4 is a diagram showing a novel color filter array that is arranged on an imaging element.

FIG. 4 is a diagram showing an embodiment of the above imaging element 16, and particularly, shows a novel color filter array that is arranged on the light receiving surface of the imaging element 16.

The color filter array of the imaging element 16 contains a basic array pattern P (a pattern shown in the thick-bordered box) corresponding to M×N (6×6) pixels, and this basic array pattern P is repetitively arranged in the horizontal direction and in the vertical direction. That is, in this color filter array, filters (R filters, G filters and B filters) of the respective colors of red (R), green (G) and blue (B) are periodically arrayed. Thus, R filters, G filters and B filters are periodically arrayed, and therefore, when an image process or the like is performed to RAW data (mosaic image) of RGB that is read from the imaging element 16, the process can be performed in accordance with the repetitive pattern.

In the color filter array shown in FIG. 4, one or more G filters, which correspond to the most contributing color for obtaining the luminance signal (in the embodiment, the color of G), are arranged on each of the horizontal, vertical, right oblique and left oblique lines of the color filter array.

Since G filters, which correspond to luminance pixels, are arranged on each of the horizontal, vertical, right oblique and left oblique lines of the color filter array, it is possible to enhance the reproduction accuracy in the demosaic process for a high frequency region, regardless of the direction of the high frequency. Here, the "demosaic process" is a process of calculating all color information of RGB for each pixel, from an RGB mosaic image corresponding to the color filter array of a single-plate-type color imaging element (a process of the conversion into a synchronous system), and is also called the demosaicing process or the synchronization process (the same applies in the specification).

Further, in the color filter array shown in FIG. 4, one or more R filters and one or more B filters, which correspond to two or more colors of different colors (in the embodiment, the colors of R and B) other than the above G color, are both arranged on each of the horizontal and vertical lines of the basic array pattern P.

Since R filters and B filters are arranged on each of the horizontal and vertical lines of the color filter array, it is possible to reduce the occurrence of a false color (color moire). Thereby, it is possible to omit an optical low-pass filter for reducing (suppressing) the occurrence of a false color. Here, even when an optical low-pass filter is applied, it is possible to apply an optical low-pass filter that has a weak effect in the cutting of high frequency components for preventing the occurrence of a false color, allowing for the avoidance of the impairment of the resolution.

Furthermore, in the basic array pattern P of the color filter array shown in FIG. 4, the pixel numbers of R pixels, G pixels and B pixels, which correspond to the R, G and B filters in the basic array pattern, are 8 pixels, 20 pixels and 8 pixels, respectively. That is, the ratio of the pixel numbers of R, G and B pixels is 2:5:2. The ratio of the pixel number of G pixels, which are the most contributing pixels for obtaining the luminance signal, is greater than the ratios of the pixel numbers of R pixels and B pixels, which involve the other colors.

As described above, the pixel number of G pixels and the pixel numbers of R and B pixels are different in ratio, and in particular the ratio of the pixel number of G pixels, which are the most contributing pixels for obtaining the luminance signal, is greater than the ratios of the pixel numbers of R and B pixels. Therefore, it is possible to suppress the aliasing at the time of demosaic processing, and also, to improve the high frequency reproducibility.

Figure 5:
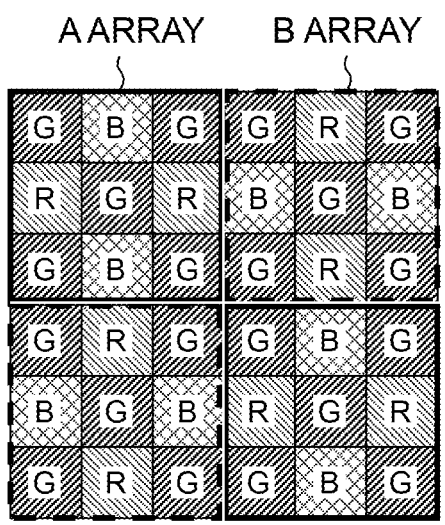
FIG. 5 is a diagram showing a state in which a basic array pattern shown in FIG. 4 is divided into four sets of 3×3 pixels.

FIG. 5 shows a state in which the basic array pattern P shown in FIG. 4 is divided into four sets of 3×3 pixels.

As shown in FIG. 5, the basic array pattern P can be regarded as an array in which an A array of 3×3 pixels surrounded by the solid line box and a B array of 3×3 pixels surrounded by the broken line box are alternately arranged in the horizontal and vertical directions.

The A array and the B array, in each of which G filters are arranged at the four corners and the center, are arranged on both diagonal lines. Further, in the A array, across the G filter at the center, R filters are arranged in the horizontal direction, and B filters are arranged in the vertical direction. On the other hand, in the B array, across the G filter at the center, B filters are arranged in the horizontal direction, and R filters are arranged in the vertical direction. That is, the positional relation of R filters and B filters is reversed between the A array and the B array, but the other arrangements are common.

Further, since the A array and the B array are alternately arranged in the horizontal and vertical directions, the G filters at the four corners of the A array and B array are G filters of a square array that corresponds to 2×2 pixels.

Figure 6A:
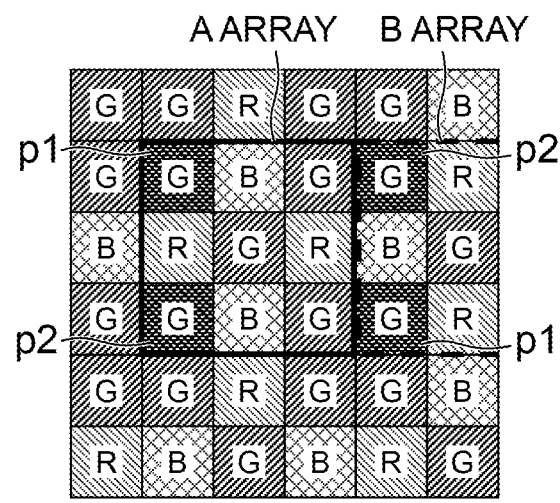
FIG. 6A is a diagram showing an arrangement of first and second phase-difference pixels and an arrangement of B pixels that can be used as phase-difference pixels, in the imaging element.
Figure 6B:
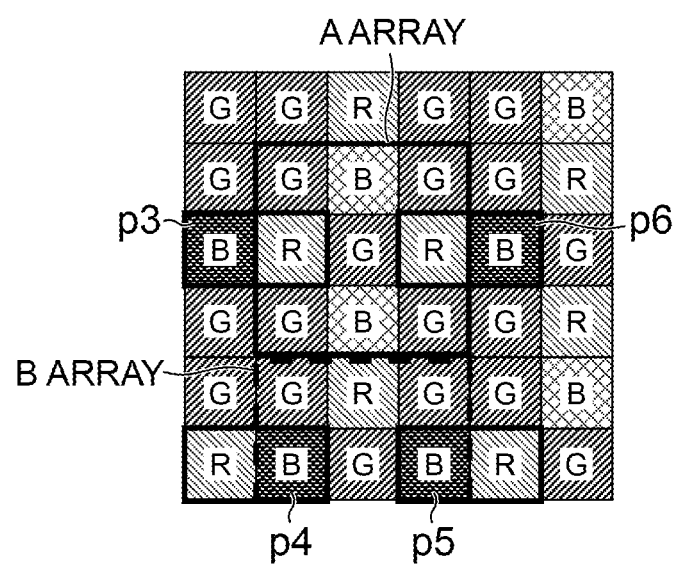
FIG. 6B is another diagram showing the arrangement of the first and second phase-difference pixels and the arrangement of B pixels that can be used as phase-difference pixels, in the imaging element.

FIG. 6A and FIG. 6B each show another basic array pattern P' that is cut out from a position different from the basic array pattern P shown in FIG. 4 and that corresponds to 6×6 pixels.

As shown in FIG. 6A, in the embodiment, the pixels that are at the positions of the upper left and lower left G filters of the G filters at the four corners of the A array are configured as a first phase-difference pixel p1 and a second phase-difference pixel p2, respectively, and the pixels that are at the positions of the upper left and lower left G filters of the G filters at the four corners of the B array are configured as a second phase-difference pixel p2 and a first phase-difference pixel p1, respectively.

Figure 7A:
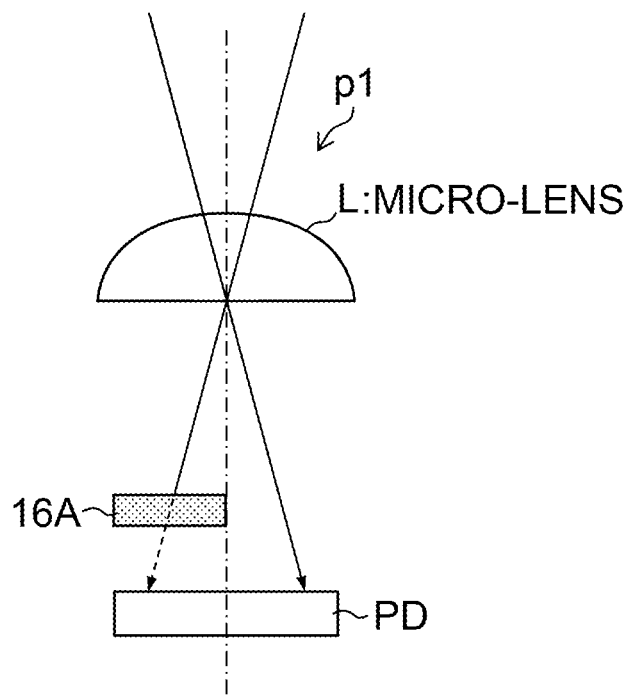
FIG. 7A is a diagram showing a configuration example of a phase-difference pixel.
Figure 7B:
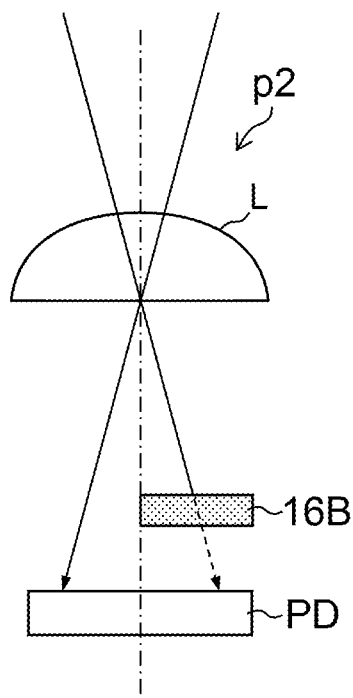
FIG. 7B is another diagram showing the configuration example of a phase-difference pixel.

FIG. 7A and FIG. 7B are enlarged views of the principal parts of the first phase-difference pixel p1 and the second phase-difference pixel p2, respectively.

As shown in FIG. 7A, a light blocking member 16A is provided on the front surface side (micro-lens L side) of a photodiode PD of the first phase-difference pixel p1. On the other hand, as shown in FIG. 7B, a light blocking member 16B is provided on the front surface side of a photodiode PD of the second phase-difference pixel p2. The micro-lenses L and the light blocking members 16A, 16B have a function as pupil-division means, and as shown in FIG. 7A, the light blocking member 16A performs the light blocking of the left half of the light receiving surface of the photodiode PD. Therefore, the first phase-difference pixel p1 receives, with respect to the optical axis, only the left side of the light flux that passes through the exit pupil of the image-taking lens 12. Further, as shown in FIG. 7B, the light blocking member 16B performs the light blocking of the right half of the light receiving surface of the photodiode PD of the second phase-difference pixel p2. Therefore, the second phase-difference pixel p2 receives, with respect to the optical axis, only the right side of the light flux that passes through the exit pupil of the image-taking lens 12. Thus, the light flux that passes through the exit pupil is divided into left and right, by the micro-lenses L and the light blocking members 16A, 16B, which are the pupil-division means, and the divided left and right fluxes enter the first phase-difference pixel p1 and the second phase-difference pixel p2, respectively.

Further, as shown in FIG. 6B, in the color filter array of the imaging element 16, R filters are arrayed in the horizontal direction across the G filter at the center of the A array, and on the other hand, B filters are arrayed in the horizontal direction across the G filter at the center of the B array. Therefore, the pixels (R pixels) on which the R filters are arranged and the pixels (B pixels p3 to p6) on which the B filters are arranged, are adjacent in the horizontal direction, at the minimum pitch. Furthermore, in FIG. 6B, the B pixels p3, p5 are adjacent in the leftward direction of the R pixel, and the B pixels p4, p6 are adjacent in the rightward direction of the R pixel. Here, when the B pixels p3, p5 are first B pixels, the B pixels p4, p6 are second B pixels.

Figure 8A:
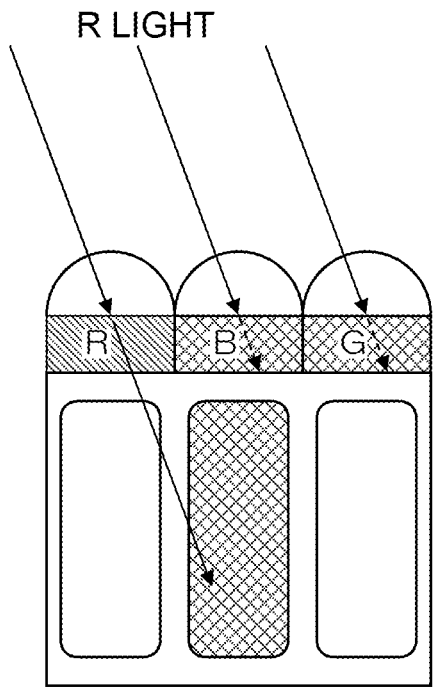
FIG. 8A is a diagram to be used for explaining a B pixel that can be used as a phase-difference pixel.
Figure 8B:
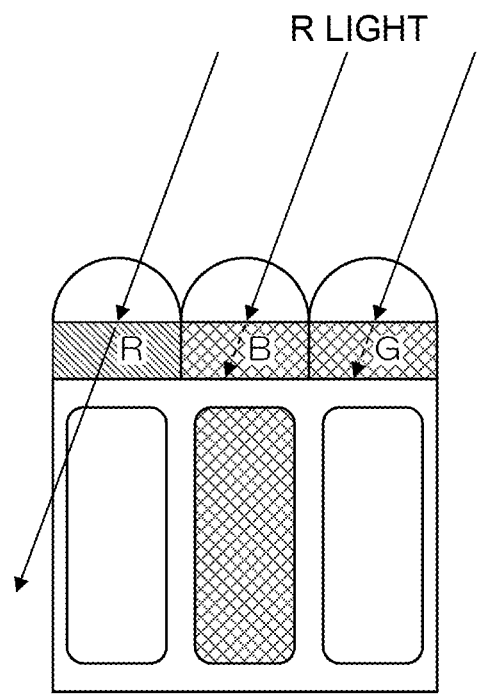
FIG. 8B is another diagram to be used for explaining the B pixel that can be used as a phase-difference pixel.

FIG. 8A and FIG. 8B are diagrams showing the internal configuration of each pixel when R, B and G pixels are arrayed in the horizontal direction (left-right direction).

As shown in FIG. 8A, when R light (test light in which the reflected light of a subject is biased to long wavelengths, light in the case of an extremely red subject or a low color temperature) enters from the left side, the R light enters the B pixel so that signal electric charges are accumulated, by the color mixing with an angle dependency from the R pixel adjacent to the left side. On the other hand, as shown in FIG. 8B, when the R light enters from the right side, since the G pixel is adjacent to the right side of the B pixel, the color mixing with an angular dependency from the R pixel does not occur, and signal electric charges are not accumulated. Alternatively, even if the color mixing occurs, it is very slight.

Therefore, for the B pixels p3, p5 adjacent in the leftward direction of the R pixels shown in FIG. 6B, when the R light enters from the right side in FIG. 6B, signal electric charges are accumulated by the color mixings with angle dependencies from the R pixels. On the other hand, for the B pixels p4, p6 adjacent in the rightward direction of the R pixels, when the R light enters from the left side in FIG. 6B, signal electric charges are accumulated by the color mixings with angle dependencies from the R pixels. That is, the B pixels p3, p5 and the B pixels p4, p6 function as the first and second phase-difference pixels, for the R light.

Back to FIG. 3, a sensor drive unit (rolling reading unit) 32 is a part that takes charge of the reading of the digital signal (image signal) from the imaging element 16, and sequentially reads the image signal for each line from the imaging element 16.

It is known that the reading scheme in a CMOS image sensor is a rolling shutter scheme in which a sequential reset and a sequential reading are performed from the upper side on a line basis. In the rolling shutter scheme, there is a time lag in exposure timing for each line, and therefore, there is a problem in that, in the case of a moving subject, the image of the subject is distorted. Therefore, when a still image is taken, a shutter drive unit 33 performs the open-close control of the mecha-shutter 15 (the control of the exposure time), for avoiding the distortion by the rolling shutter.

The image signal (R, G and B signals) read from the imaging element 16 is output to an image input controller 22.

To the digital image signals input through the image input controller 22, a digital signal processing unit 24 performs signal processes such as an offset process, a white balance correction, a gamma correction process, a demosaic process and a YC process.

The image data processed by the digital signal processing unit 24 are input to a VRAM 50. The VRAM 50 includes an A region and a B region for recording image data each of which shows an image for one frame. In the VRAM 50, the image data showing an image for one frame are rewritten alternately in the A region and the B region. The written image data are read from the region other than a region in which image data are being rewritten, of the A region and B region in the VRAM 50.

The image data read from the VRAM 50 are encoded in a video encoder 28, and then, are output to the liquid crystal monitor 30 provided on the back surface of the camera. Thereby, subject images are continuously displayed on the display screen of the liquid crystal monitor 30.

When the first-step push (half-push) of the shutter button 2 of the operation unit 38 is performed, the CPU 40 starts the AF operation and the AE (Automatic Exposure), moves, in the optical axis direction, a focus lens in the image-taking lens 12 through the lens drive unit 36, and performs such a control that the focus lens comes to the focusing position.

An AF processing unit (phase-difference detection unit) 42, which is a part to perform a phase-difference AF process according to the present invention, detests the phase difference using the respective output signals of the first phase-difference pixels p1 and second phase-difference pixels p2 shown in FIG. 6A, or detects the phase difference using the respective output signals of the B pixels p3, p5 and B pixels p4, p6 shown in FIG. 6B. Here, the detail of the phase-difference detection by the AF processing unit 42 is described later.

In response to the zoom command from the zoom button 5, the CPU 40 advances or retreats the zoom lens in the optical axis direction through the lens drive unit 36, and changes the focal length.

Further, at the time of the half-push of the shutter button 2, the image data output from the imaging element 16 are taken in an AE detection unit 44.

The AE detection unit 44 integrates the G signals in the whole screen, or integrates the G signals that are weighted differently between the central part and edge part of the screen, and outputs the integrated value to the CPU 40. The CPU 40 calculates the brightness (image-taking Ev value) of the subject, from the integrated value input by the AE detection unit 44, and based on the image-taking Ev value, determines the F-value of the diaphragm 14 and the exposure time (shutter speed) by the mecha-shutter 15, in accordance with a program chart.

Here, when a moving image is taken, the mecha-shutter 15 is opened, image data are continuously read from the imaging element 16, the brightness of the subject is calculated similarly to the above, and the shutter speed (the electric charge accumulation time by the rolling shutter) is controlled by the sensor drive unit 32.

Further, reference numeral 47 designates a ROM (EEPROM) in which a camera control program, the defect information of the imaging element 16, and various parameters or tables to be used for image processes and the like are stored.

When the AE operation and AF operation by the half-push of the shutter button 2 is finished and the second-step push (full-push) of the shutter button is performed, in response to the push, and that are output from the imaging element 16 are input from the image input controller 22 to a memory (SDRAM) 48, and are temporarily stored.

The image data temporarily stored in the memory 48 are appropriately read by the digital signal processing unit 24, and here, signal processes including an offset process, a gain control process such as a white balance correction and a sensitivity correction, a gamma correction process, the demosaic process, an image process for edge enhancement, and a YC process (a generation process of luminance data and color difference data of the image data) are performed. The image data (YC data) after the YC process are stored in the memory 48, again.

The YC data stored in the memory 48 are output to a compression/decompression processing unit 26, and, after the execution of a compression process such as JPEG (joint photographic experts group), are stored in the memory 48, again. From the YC data (compressed data) stored in the memory 48, an image file is generated, and the image file is read by a medium controller 52, and is stored in the memory card 54.

[Phase-Difference AF Process]

Figure 9:
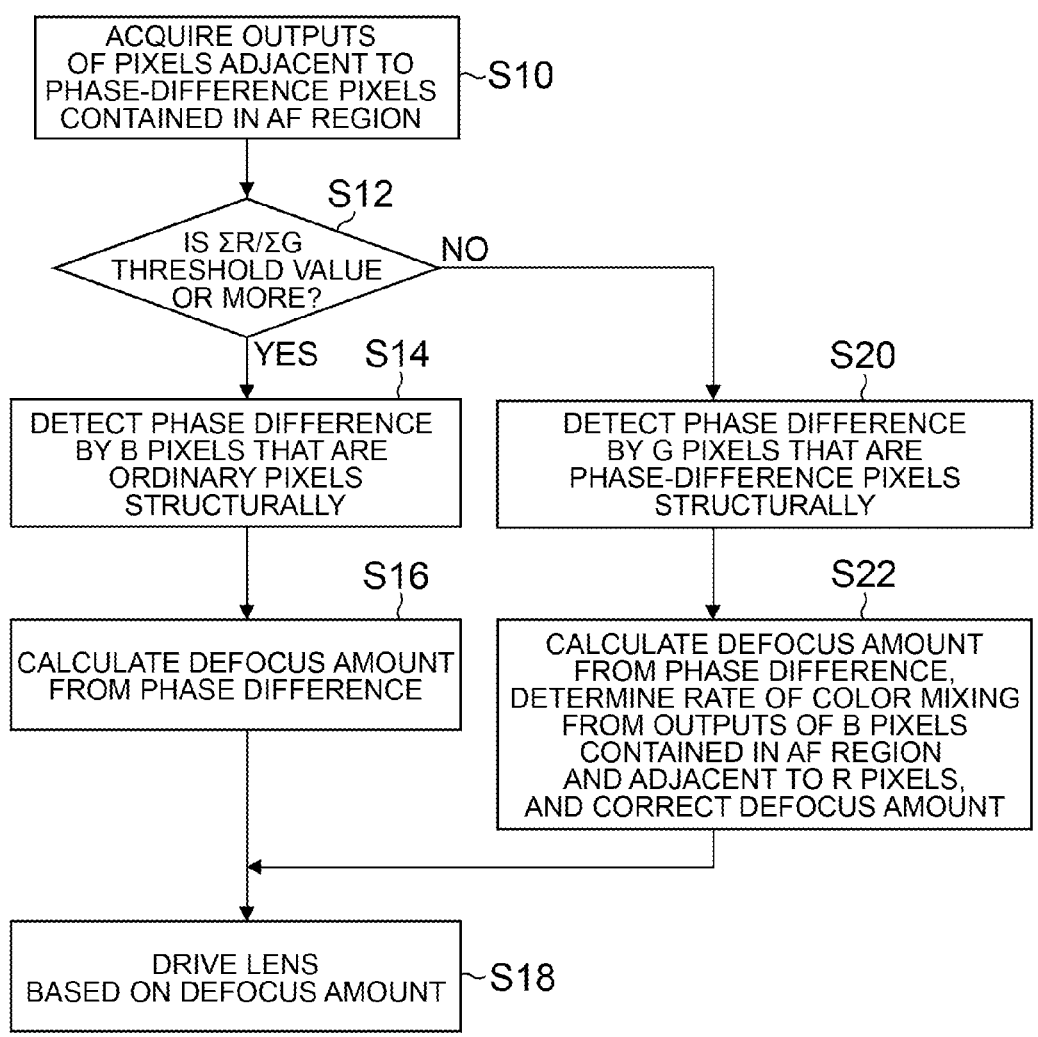
FIG. 9 is a flowchart showing an automatic focus adjustment method according to the present invention.

FIG. 9 is a flowchart showing an automatic focus adjustment method according to the present invention.

When the color mixing occurs in the phase-difference pixel, it is impossible to properly detect the phase difference and to properly perform the focusing. As the wavelength of incident light becomes longer, the leak into adjacent pixels is more likely to occur, and the color mixing is more likely to occur. Therefore, first, whether the subject is an extremely red subject, or whether the color temperature is low is decided.

Figure 10:
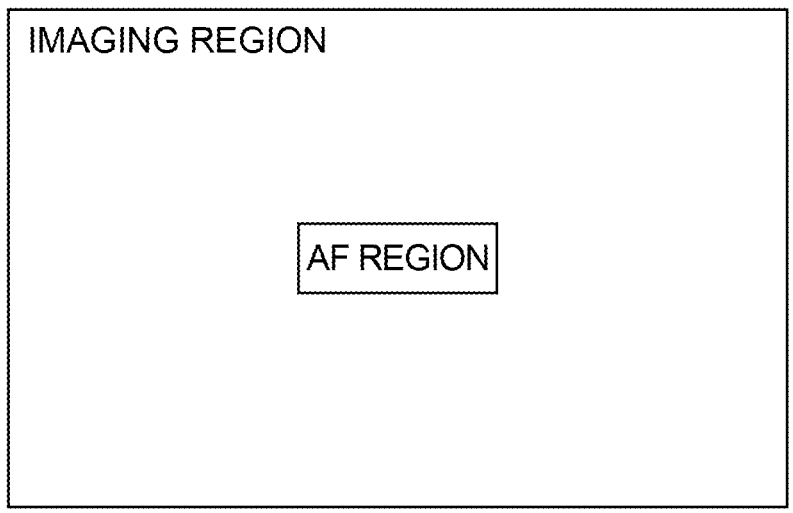
FIG. 10 is a diagram showing an imaging region and an AF region of the imaging element.

In FIG. 9, first, the AF processing unit 42 (decision unit) acquires the output signals (R signal, G signal, B signal) of RGB pixels adjacent to the phase-difference pixels that are contained in an AF region set in the imaging region as shown in FIG. 10 (step S10).

Figure 11:
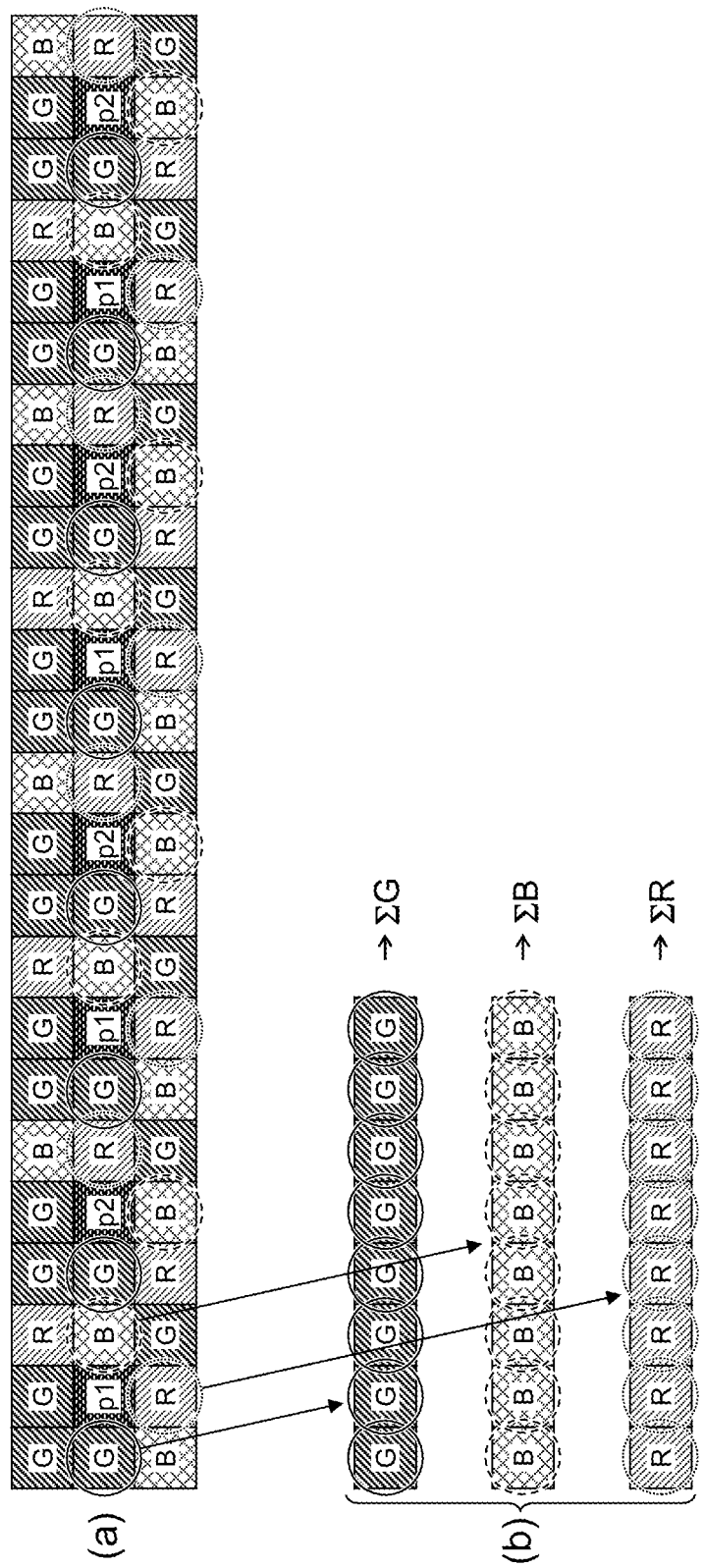
FIG. 11 is a diagram to be used for explaining a method for deciding a subject color from the signals of pixels in the AF region.

(a) part of FIG. 11 shows a pixel group at a part of the AF region shown in FIG. 10. From the AF region, RGB pixels are each extracted by the same number. In the example shown in (b) part of FIG. 11, for each of RGB pixels, eight pixels are extracted for each color. The output signals of the extracted RGB pixels are integrated for each color, and integrated values (ΣG), (ΣB), (ΣR) are calculated.

Subsequently, in FIG. 9, the ratio (ΣR/ΣG) between the integrated value (ΣR) and the integrated value (ΣG) is calculated, and whether the ratio (ΣR/ΣG) is a previously set threshold value or more is decided (step S12). When the subject in the AF region is an extremely red subject, or when the color temperature is low, the ratio (ΣR/ΣG) increases so that the ratio (ΣR/ΣG) becomes the threshold value or more, and the decision that the subject color in the AF region is a red color (or that the color temperature is low) is made.

Here, for example, the threshold value can be set as follows. A subject with an achromatic color is irradiated with the illumination light whose saturation is gradually changed from white to red, and the output signals of the pixels in the AF region of the imaging element 16 are acquired for each degree of saturation. The phase difference determined by the respective output signals of the first phase-difference pixels p1 and second phase-difference pixels p2 of the output signals acquired for each degree of saturation, and the phase difference determined by the respective output signals of the B pixels p3, p5 and B pixels p4, p6, which can be used as phase-difference pixels under the R light, are compared. Then, the ratio (ΣR/ΣG) under the illumination (saturation) when the phase difference determined by the respective output signals of the B pixels p3, p5 and B pixels p4, p6, for the first time, gets to be higher in accuracy than the phase difference determined by the respective output signals of the first phase-difference pixels p1 and second phase-difference pixels p2, is determined, and this ratio (ΣR/ΣG) is adopted as the threshold value. It is preferable that the threshold value be previously determined for each imaging device at the adjustment time before product shipment, and be stored in the ROM 47.

Back to FIG. 9, in the case of deciding that the ratio (ΣR/ΣG) is the threshold value or more in step S12 (in the case of "Yes"), the AF processing unit 42 detects the phase difference by the respective output signals of the B pixels p3, p5 and B pixels p4, p6 in the AF region (step S14).

Figure 12:
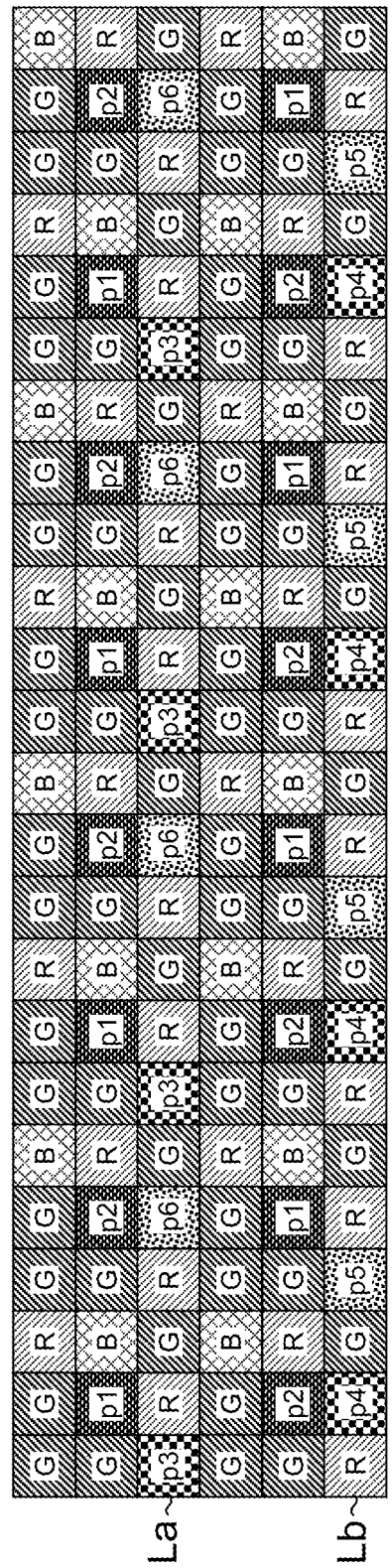
FIG. 12 is a diagram showing an arrangement of B pixels to be used as phase-difference pixels.

The detection of the phase difference by the AF processing unit 42 is performed as follows. As shown in FIG. 12, the B pixel p3 and the B pixel p6 are alternately arranged in the line direction of a horizontal line La (first line), and similarly, the B pixel p4 and the B pixel p5 are alternately arranged in the line direction of a horizontal line Lb (second line) that is three lines below the horizontal line La. A first phase difference is detected, based on the respective output signals of a longitudinal pair of the B pixels p3, p4 on the horizontal lines La, Lb. That is, the first phase difference is determined from the shift amount in the left-right direction between the respective output signals when the correlation of the output signals of the longitudinal pair of B pixels that are the B pixel p3 and the B pixel p4 is maximized (when the integrated value of the difference absolute value of the respective output signals of the longitudinal pair of B pixels is minimized). Similarly, a second phase difference is determined from the shift amount in the left-right direction between the respective output signals when the correlation of the output signals of a longitudinal pair of B pixels that are the B pixel p5 and the B pixel p6 is maximized. Then, the first and second phase differences determined in this way are arithmetically averaged, and thereby, the phase difference is detected.

As shown in FIG. 12, as for the longitudinal pair of the B pixel p3 and the B pixel p4, the B pixel p4 is arranged at the position that is deviated from the B pixel p3 in the rightward direction by one pixel pitch, and on the other hand, as for the longitudinal pair of the B pixel p5 and the B pixel p6, the B pixel p5 is arranged at the position that is deviated from the B pixel p6 in the leftward direction by one pixel pitch. However, by determining the first and second phase differences and arithmetically averaging the determined first and second phase differences in the above way, it is possible to calculate an accurate phase difference in which the left-right directional deviations of the longitudinal pairs of the B pixels are canceled out. Further, although the horizontal lines La, Lb are kept away in the vertical direction by three pixels, it is possible to avoid the occurrence of a phase difference detection error due to the distance between the horizontal lines La, Lb.

Subsequently, the focus position by the image-taking lens 12 and the deviation amount (defocus amount) from the image-forming surface of the imaging element 16 are calculated from the detected phase difference (step S16). The calculated defocus amount is output from the AF processing unit (defocus amount calculation unit) 42 to the CPU (focus adjustment unit) 40. Here, the relation between the phase difference and the defocus amount can be expressed by a definite relational expression, and therefore, it is possible to calculate the defocus amount from the relational expression, by detecting the phase difference.

When the defocus amount is input from the AF processing unit 42, the CPU 40 moves the focus lens in the image-taking lens 12 through the lens drive unit (focus adjustment unit) 36, such that the defocus amount is zero (step S18).

Thereby, it is possible to perform the focus adjustment (the adjustment of the focus position) such that the focus lens is focused on the subject in the AF region.

On the other hand, in the case of deciding that the ratio (ΣR/ΣG) is less than the threshold value (in the case of "No") in step S12, the AF processing unit 42 detects the phase difference by the respective output signals of the first phase-difference pixel p1 and second phase-difference pixel p2 in the AF region (step S20). Here, in the embodiment, the first phase-difference pixel p1 and the second phase-difference pixel p2 are each assigned to G pixels (see FIG. 6A), but the filters of the pixels of the first phase-difference pixel p1 and second phase-difference pixel p2 may be colorless (white or gray).

Figure 13:
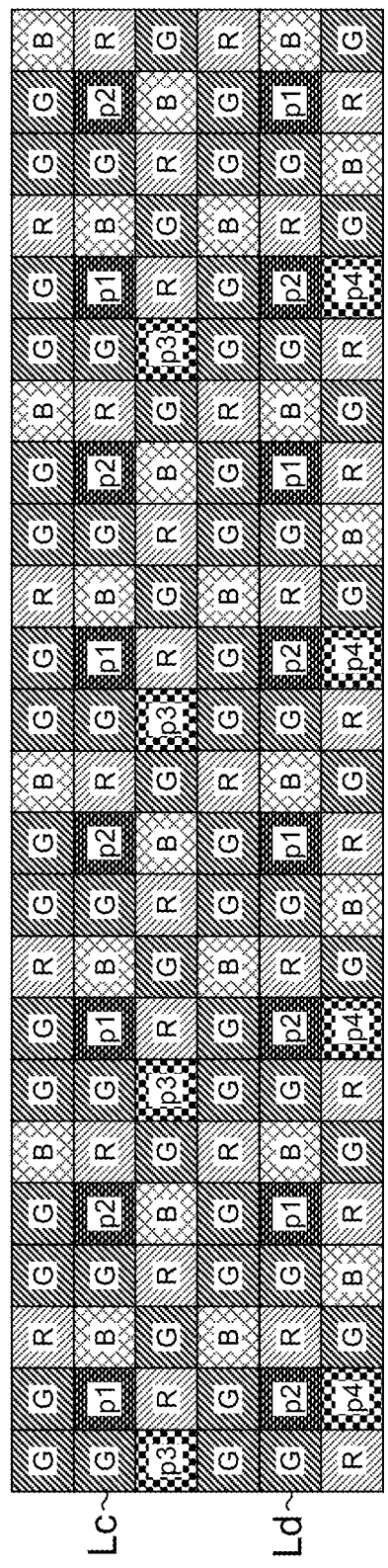
FIG. 13 is a diagram showing an arrangement of the first and second phase-difference pixels.

The phase difference detection by the respective output signals of the first phase-difference pixel p1 and second phase-difference pixel p2 is performed, similarly to the phase difference detection in step S14. That is, as shown in FIG. 13, in the first phase-difference pixel p1 and second phase-difference pixel p2 that are alternately arranged at regular intervals in the line direction of a horizontal line Lc (third line) and the second phase-difference pixel p2 and first phase-difference pixel p1 that are alternately arranged at regular intervals in the line direction of a horizontal line Ld (fourth line), the first phase difference is detected based on the respective output signals of a longitudinal pair of the first phase-difference pixel p1 and second phase-difference pixel p2 on the horizontal lines Lc, Ld, and the second phase difference is detected based on the respective output signals of a longitudinal pair of the second phase-difference pixel p2 and first phase-difference pixel p1 whose vertical relation is opposite to the longitudinal pair of the first phase-difference pixel p1 and second phase-difference pixel p2. Then the first phase difference and the second phase difference are arithmetically averaged, and thereby, the phase difference is calculated.

By the way, the rolling shutter scheme in which the mecha-shutter 15 is opened at the time of taking of a moving image, and the sequential reset and sequential reading are performed on a line basis, is applied. Therefore, a time lag in exposure timing occurs for each line, and a distortion (rolling distortion) of the subject image occurs due to the movement of the subject or the like. Accordingly, in the rolling shutter scheme, the line image on the horizontal line Lc and the line image on the horizontal line Ld are sometimes relatively deviated in the left-right direction.

However, since, as described above, the phase difference is detected by arithmetically averaging the first phase difference detected by the respective output signals of the longitudinal pair of the first phase-difference pixel p1 and second phase-difference pixel p2 and the second phase difference detected by the respective output signals of the longitudinal pair of the second phase-difference pixel p2 and first phase-difference pixel p1, it is possible to detect an accurate phase difference in which the influence of the relative deviation of the line images is canceled out.

Thereby, in a state in which the mecha-shutter 15 is opened (without using the mecha-shutter 15), the phase difference can be detected using the image signal read by the rolling shutter scheme, allowing for the focusing at the time of taking of a moving image, and also the speed-up of the focusing at the time of taking of a still image.

Subsequently, the ratio between the output signal of the B pixel in the AF region for which an R pixel is adjacent to the right side (the B pixels p3, p5 in FIG. 12) and the output signal of the B pixel for which an R pixel is adjacent to the left side (the B pixels p4, p6 in FIG. 12) is determined, and from this ratio, the rate of the color mixing from the R pixel to the second phase-difference pixel p2 for which the R pixel is adjacent to the left side is determined. By the determined rate of the color mixing and the phase difference detected in step S20, a corrected defocus amount is calculated (step S22). Here, the rate of the color mixing is determined from the ratio between the output of the B pixel for which the R pixel is adjacent to the right side and the output of the B pixel for which the R pixel is adjacent to the left side, but without being limited to this, the rate of the color mixing may be calculated based on the output signal of one of the B pixels.

Further, without being limited to the above calculation method of the rate of the color mixing, the rate of the color mixing from the R pixel adjacent to the second phase-difference pixel p2 may be previously stored. Then, the amount of the color mixing may be calculated by the rate of the color mixing and the output signal of the R pixel, and the defocus amount may be calculated by the amount of the color mixing and the phase difference. Further, without being limited to the amount of the color mixing from the R pixel, the amount of the color mixing may be calculated by adding, to each other, the amounts of the color mixings from other-color pixels adjacent to the top, bottom, left and right, or the amount of the color mixing to the first phase-difference pixel p1 may be calculated.

Figure 14:
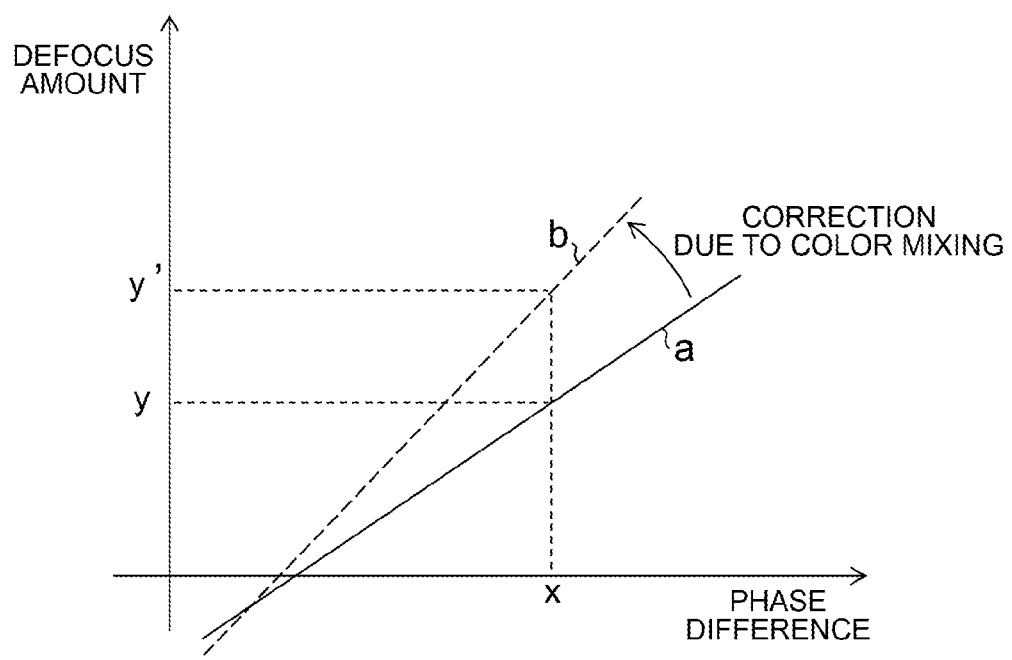
FIG. 14 is a graph showing an exemplary relational expression between phase differences and defocus amounts.

As shown in FIG. 14, a relational expression indicating the relation between the phase difference and the defocus amount when the color mixing does not occur is designated by reference character a. The relational expression a is changed by the color mixing. For example, the relational expression a is changed to a relational expression b. Therefore, the relational expression is altered depending on the rate of the color mixing, and the defocus amount is corrected. In the example shown in FIG. 14, when the detected phase difference is x, a defocus amount y is calculated by the relational expression a, if the color mixing does not occur. However, even when the phase difference x is similarly detected, a defocus amount y' is calculated, if the color mixing occurs and the change to the relational expression b is performed.

Here, since the range to be influenced by the color mixing is not wide, it is possible to increase the processing efficiency by calculating the rate of the color mixing from pixels that are adjacent at the minimum pitch for pixels and that are adjacent in the horizontal direction and the vertical direction, instead of all the direction.

When the defocus amount is calculated in this way, the transition to step S18 is performed, and here, the drive control of the focus lens is performed depending on the defocus amount.

In the phase difference AF when a moving image is taken, the processes in steps S10, S12, S14, S16 and S18, or the processes in step S10, S12, S20, S22 and S18 are repeated.

Here, in the above embodiment, the relational expression is altered depending on the rate of the color mixing. However, a three-dimensional look-up table for reading the defocus amount in which the rate of the color mixing and the phase difference are adopted as parameters may be previously prepared, and the defocus amount may be read from the three-dimensional look-up table.

Alternative Embodiments

In the above embodiment, the defocus amount is calculated based on the detected phase difference and the rate of the color mixing. However, the amount of the color mixing from a peripheral pixel to the second phase-difference pixel p2, or the first phase-difference pixel p1 and second phase-difference pixel p2 may be calculated, and the calculated amount of the color mixing may be subtracted from the output signal of the second phase-difference pixel p2, or the respective output signals of the first phase-difference pixel p1 and second phase-difference pixel p2, for acquiring an output signal with no color mixing. In this case, the defocus amount can be calculated from the relational expression a in FIG. 14.

Further, the AF region shown in FIG. 10 is set as an oblong region at the central part of the imaging region. However, since B pixels are arranged in the whole imaging region, it is possible to perform the phase difference AF based on the B pixels, no matter what position in the imaging region the AF region is set at. Further, when the body of the imaging device is horizontally held, the AF region shown in FIG. 10 is an AF region that is long in the horizontal direction (the left-right direction: the first and second directions), but may be an AF region that is long in the vertical direction (the top-bottom direction: the third and fourth directions). For example, it is preferable to provide a gravity sensor (longitudinal/lateral image-taking detection unit) or the like that detects whether an image-taking is a lateral image-taking or a longitudinal image-taking, and to detect the phase difference based on the output signals of the B pixels in the AF region that is long in the horizontal direction, when the longitudinal/lateral image-taking detection unit detects the lateral image-taking, and detect the phase difference based on the output signals of the B pixels in the AF region that is long in the vertical direction (the AF region that is long in the horizontal direction with respect to the body of the imaging device held longitudinally), when the longitudinal/lateral image-taking detection unit detects the longitudinal image-taking. Here, in the case where the phase-difference pixels are arranged on the whole surface of the imaging region, no matter what position in the imaging region is set as the AF region, it is possible to perform the phase difference detection, similarly to the above phase difference detection by the B pixels.

Further, without being limited to an imaging element having the color filter array shown in FIG. 4, the imaging element to be applied to the present invention may be any imaging element in which R pixels and B pixels are adjacent at the minimum pitch and that has a B pixel adjacent in the first direction (leftward direction) to an R pixel (first R pixel), and a B pixel adjacent in the second direction (rightward direction), which is opposite to the first direction, to a second R pixel different from the first R pixel.

Further, in the above embodiment, whether the subject color is a red color, or whether the color temperature is low is decided, and in the case of deciding that the subject color is a red color, the phase difference is detected using the output signals of the first B pixels (the B pixels p3, p5) and the second B pixels (the B pixels p4, p6). Instead, in the case of deciding that the subject color is a red color, from the output signals of the B pixels p3, p5 (first B pixels), the rate of the color mixing from the R pixel that is adjacent to the horizontal right side of the B pixel may be determined, and using the determined rate of the color mixing, the rate of the color mixing to the phase-difference pixel p2, for which an R pixel is similarly adjacent to the horizontal right side, may be determined.

As the wavelength of incident light becomes longer, the leak into adjacent pixels is more likely to occur, and the color mixing is more likely to occur. However, in the case where the subject color is red, or in the case where the color temperature is low, there is little light to pass through the blue filters on B pixels, and most are color mixing components from adjacent R pixels. Therefore, by using the output signals of the B pixels that are arranged so as to be adjacent to R pixels, it is possible to calculate the rate of the color mixing at a high accuracy. This is a configuration that cannot be actualized by a conventional and general Bayer array, in which R pixels and B pixels are adjacent to only G pixels in the horizontal direction or the vertical direction, and is a configuration in which the characteristic of the color filter array is utilized.

Further, it is preferable to subtract the influence of the color mixing from the other-color pixels adjacent in the directions other than the horizontal direction (the first direction or the second direction) in which an R pixel is adjacent. For example, in FIG. 12, the phase-difference pixel p2 is adjacent to an R pixel, on the right side when facing the drawing, but other than this, is adjacent to a G pixel on the left side, a G pixel on the top side, and a B pixel on the bottom side, and is influenced also by the color mixings from these adjacent pixels in the horizontal direction and the vertical direction. Therefore, it is preferable to subtract the influence of the color mixings from these adjacent pixels. On this occasion, from the output signal of the B pixel p3 or p5, the rate of the color mixing therefor can be determined and can be adopted as the rate of the color mixing for the phase-difference pixel p2, and in this case also, it is possible to determine the rate of the color mixing at a higher accuracy, relative to the conventional and general Bayer array. That is, in the Bayer array, a pixel that is adjacent to an R pixel in the horizontal direction and the vertical direction is only a G pixel, and it is possible that the rate of the color mixing is determined from the output signal of the G pixel. However, the G pixel is adjacent to two R pixels in the horizontal direction and the vertical direction, and the color mixings of both of the R pixel to the G pixel and the G pixel to the R pixel occur concurrently. Therefore, for the G pixel, it is difficult to accurately calculate the rate of the color mixings from the peripheral pixels. In the present invention, the rate of the color mixing from the periphery is calculated for the B pixel. Thereby, because of a short wavelength, the color mixing (the leak of light) from the B pixel to the peripheral pixels is very slight, and the color mixings do not occur concurrently. Therefore, it is possible to accurately calculate the color mixing component from the peripheral pixels.

Further, the above characteristic and effect can be obtained, even when whether the subject color is a red color or whether the color temperature is low is not decided. That is, by utilizing the characteristic of the color filter array, the narrowness of the range to be influenced by the color mixing, and the dominance of the influence of the color mixing from the pixel that is adjacent at the minimum pixel pitch, the rate of the color mixing from the adjacent R pixel is determined from the output signal of the B pixel that is adjacent at the minimum pixel pitch, and is adopted as the rate of the color mixing for the phase-difference pixel that is adjacent to the R pixel. Thereby, it is possible to accurately calculate the rate of the color mixing to the phase-difference pixel.

Figures 15, 16:
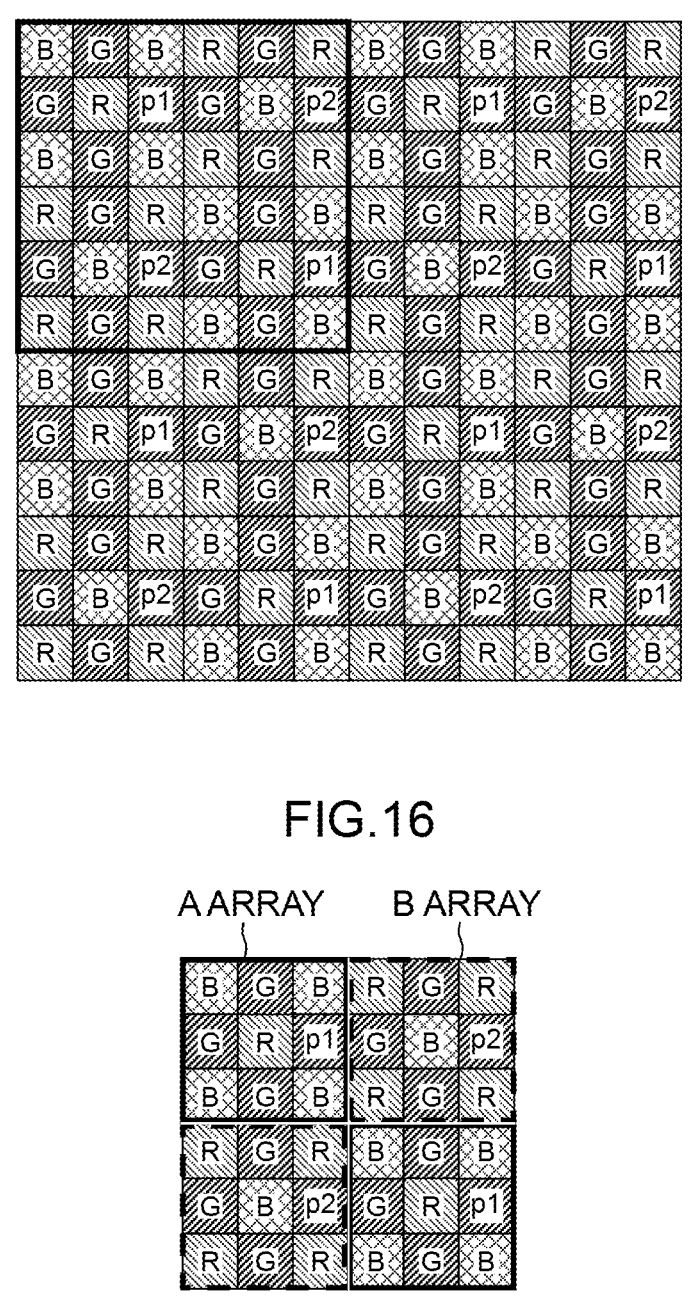

Further, the color filter array is not limited to the array shown in FIGS. 4, 5, 6 and 12, and may be an array shown in FIG. 15 and FIG. 16.

The color filter array shown in FIG. 15 contains a basic array pattern (a pattern shown in the thick-bordered box) that is a square array pattern corresponding to 6×6 pixels, and this basic array pattern is repetitively arranged in the horizontal and vertical directions. That is, in this color filter array, filters (R filters, G filters and B filters) of the respective colors of R, G and B are periodically arrayed.

FIG. 16 shows a state in which the basic array pattern shown in FIG. 15 is divided into four sets of 3×3 pixels.

As shown in FIG. 16, the basic array pattern can be regarded as an array in which an A array of 3×3 pixels surrounded by the solid line box and a B array of 3×3 pixels surrounded by the broken line box are alternately arranged in the horizontal and vertical directions.

In the A array, an R filter is arranged at the center, B filters are arranged at the four corners, and G filters are arranged at the top, bottom, left and right to the R filter at the center. On the other hand, in the B array, a B filter is arranged at the center, R filters are arranged at the four corners, G filters are arranged at the top, bottom, left and right to the B filter at the center. The positional relation of R filters and B filters is reversed between the A array and the B array, but the other arrangements are common.

As shown in FIG. 16, the first phase-difference pixel p1 is arranged at the pixel position corresponding to the G filter that is adjacent to the right side of the R filter of the A array, and the second phase-difference pixel p2 is arranged at the pixel position corresponding to the G filter that is adjacent to the right side of the B filter of the B array.

Further, as shown in FIG. 16, as the four pixels at the central part of the basic array pattern, RB pixels and BR pixels are arranged so as to be adjacent, and G pixels are adjacent to the four sides of the four pixels.

Therefore, also in an imaging device including an imaging element that has the color filter array shown in FIG. 15 and FIG. 16, in the case of an extremely red subject and a low color temperature, it is possible to accurately perform the phase difference AF, using the output signals of ordinary B pixels, instead of the first and second phase-difference pixels.

That is, the imaging element to be applied to the present invention is not limited to the above embodiment, and may be any imaging element in which the first and second phase-difference pixels are arranged and that has a B pixel (first B pixel) adjacent in the first direction (leftward direction) to an R pixel (first R pixel) at the minimum pitch, and a B pixel (second B pixel) adjacent in the second direction (rightward direction), which is opposite to the first direction, to an R pixel (second R pixel) different from the first R pixel.

As an alternative embodiment of the imaging device 10, for example, there are a portable telephone, a smart phone having a camera function, a PDA (Personal Digital Assistants), and a portable game machine. In the following, to take a smart phone as an example, the details are explained with reference to the drawings.

<Configuration of Smart Phone>

Figure 17:
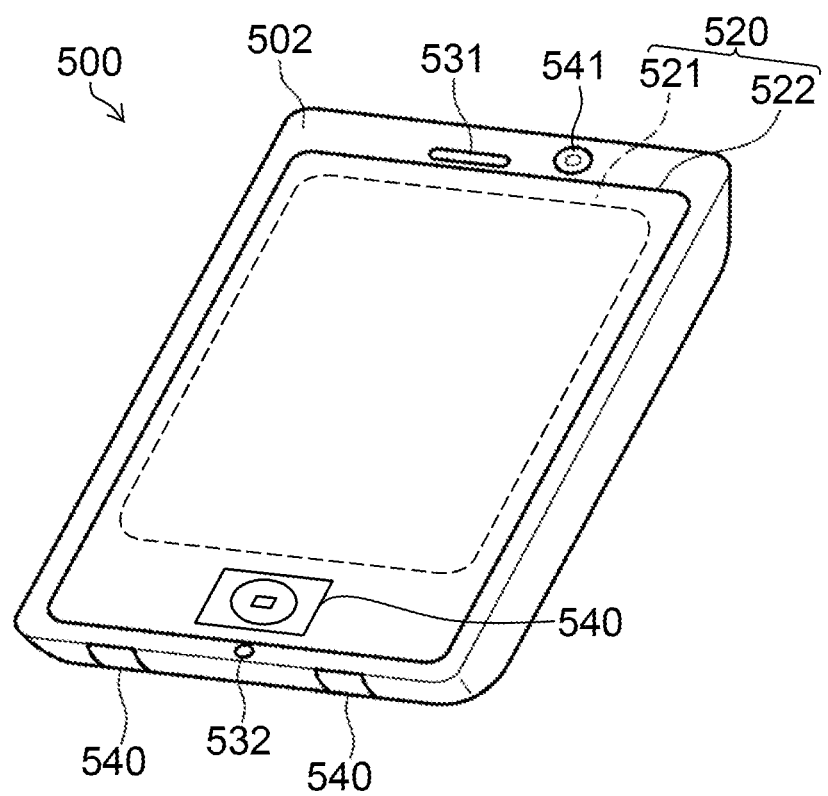
FIG. 17 is an external view of a smart phone that is an alternative embodiment of the imaging device.

FIG. 17 shows an external view of a smart phone 500 that is an alternative embodiment of the imaging device 10. The smart phone 500 shown in FIG. 17 has a case 502 in a flat plate shape, and, on one surface of the case 502, includes a display/input unit 520 in which a display panel 521 as a display unit and an operation panel 522 as an input unit are unified. Further, the case 502 is provided with a speaker 531, a microphone 532, an operation unit 540 and a camera unit 541. Here, the configuration of the case 502 is not limited to this. For example, a configuration in which the display unit and the input unit are separated can be adopted, or a configuration of having a folding structure or a sliding mechanism can be adopted.

Figure 18:
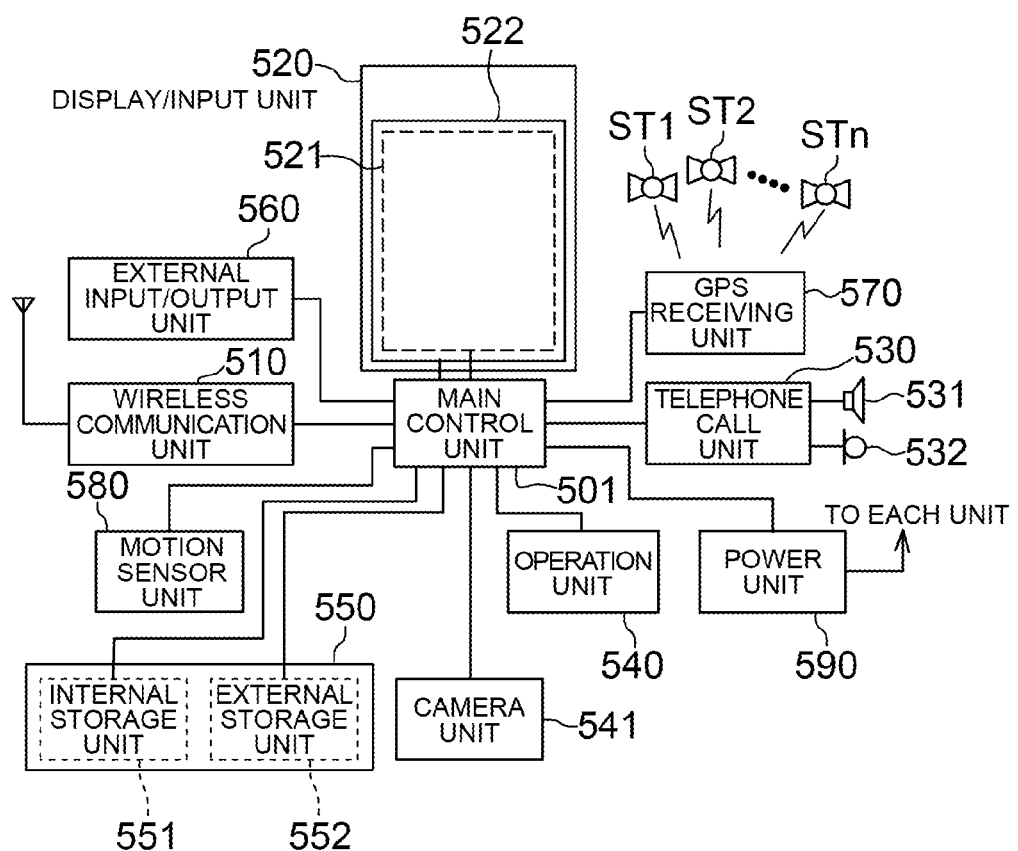
FIG. 18 is a block diagram showing the configuration of the principal part of the smart phone.

FIG. 18 is a block diagram showing the configuration of the smart phone 500 shown in FIG. 17. As shown in FIG. 18, the smart phone includes a wireless communication unit 510, the display/input unit 520, a telephone call unit 530, the operation unit 540, the camera unit 541, a storage unit 550, an external input/output unit 560, a GPS (Global Positioning System) receiving unit 570, a motion sensor unit 580, a power unit 590, and a main control unit 501, as the main constituent elements. Further, the smart phone 500 has a wireless communication function to perform the mobile wireless communication through a base station device BS and a mobile communication network NW, as the main function.

The wireless communication unit 510 performs a wireless communication with a base station device BS contained in a mobile communication network NW, in accordance with an instruction of the main control unit 501. Using the wireless communication, the sending and receiving of various file data such as audio data and image data, e-mail data or the like, and the receiving of Web data, streaming data or the like are performed.

The display/input unit 520 is a so-called touch panel that, by the control from the main control unit 501, displays an image (a still image and a moving image), character information or the like to visually transmit the information to a user, and therewith, detects the user operation to the displayed information, and includes the display panel 521 and the operation panel 522. In the case of viewing a generated 3D image, it is preferable that the display panel 521 be a 3D display panel.

The display panel 521 is an LCD (Liquid Crystal Display), an OELD (Organic Electro-Luminescence Display) or the like that is used as a display device. The operation panel 522 is a device that is placed such that an image to be displayed on the display surface of the display panel 521 can be visually recognized and that detects a single or multiple coordinates to be operated by a finger of a user or a stylus. When this device is operated by a finger of a user or a stylus, a detection signal generated due to the operation is output to the main control unit 501. Next, the main control unit 501 detects the operation position (coordinate) on the display panel 521, based on the received detection signal.

As shown in FIG. 17, the display panel 521 and operation panel 522 of the smart phone 500 are unified to constitute the display/input unit 520, and are arranged such that the operation panel 522 completely covers the display panel 521. In the case of adopting this arrangement, the operation panel 522 may have the function to detect the user operation, also in the region outside the display panel 521. In other words, the operation panel 522 may include a detection region that is the superposition part overlapping with the display panel 521 (hereinafter, referred to as a display region), and a detection region that is other than it and that is the outer edge part not overlapping with the display panel 521 (hereinafter, referred to as a non-display region).

Here, the size of the display region and the size of the display panel 521 may accord completely, but both does not always need to accord. Further, the operation panel 522 may include two sensitive regions: the outer edge part and the inner part that is other than it. Moreover, the width of the outer edge part is appropriately designed depending on the size of the case 502 and the like. Furthermore, examples of the position detection scheme to be adopted in the operation panel 522 include a matrix switch scheme, a resistive film scheme, a surface acoustic wave scheme, an infrared ray scheme, an electromagnetic induction scheme and an electrostatic capacity scheme, and any scheme can be adopted.

The telephone call unit 530, which includes the speaker 531 and the microphone 532, converts a user voice input through the microphone 532 into audio data capable of being processed in the main control unit 501, to output it to the main control unit 501, and decodes audio data received by the wireless communication unit 510 or the external input/output unit 560, to output it from the speaker 531. Further, as shown in FIG. 17, for example, the speaker 531 can be mounted on the same surface as a surface on which the display/input unit 520 is provided, and the microphone 532 can be mounted on the side surface of the case 502.

The operation unit 540 is a hardware key using a key switch or the like, and receives an instruction from a user. For example, as shown in FIG. 17 the operation unit 540, which is mounted on the lower surface below the display unit of the case 502 of the smart phone 500, is a push-button switch that is turned on when being pushed by a finger or the like and becomes the off state by the restring force of a spring or the like when the finger is released.

The storage unit 550 stores a control program and control data of the main control unit 501, address data associated with the name, telephone number and others of a communication partner, sent or received e-mail data, Web data downloaded by Web browsing, and downloaded content data, and further, temporarily stores streaming data or the like. Further, the storage unit 550 is constituted by an internal storage unit 551 built in the smart phone, and an external storage unit 552 having a detachable external memory slot. Here, each of the internal storage unit 551 and the external storage unit 552 that constitute the storage unit 550 is implemented by using a storing medium such as a flash memory type memory, a hard disk type memory, multimedia card micro type memory, card type memory (for example, Micro SD® memory or the like), a RAM (Random Access Memory), or a ROM (Read Only Memory).

The external input/output unit 560 plays a role as an interface to all external apparatuses that is linked with the smart phone 500, and is directly or indirectly connected with another external apparatus, through a communication (for example, the universal serial bus (USB), IEEE1394 or the like), or a network (for example, the internet, a wireless LAN, Bluetooth®, RFID (Radio Frequency Identification), the infrared communication (Infrared Data Association: IrDA)®, UWB (Ultra Wideband)®, ZigBee®, or the like).

Examples of the external apparatus to be linked with the smart phone 500 include a wired or wireless headset, a wired or wireless external battery charger, a wired or wireless data port, a memory card or SIM (Subscriber Identity Module Card)/UIM (User Identity Module Card) card to be connected through a card socket, an external audio and video apparatus to be connected through an audio and video I/O (Input/Output) terminal, an external audio and video apparatus to be connected by wireless, a smart phone to be connected by wire or wirelessly, a personal computer to be connected by wire or wirelessly, a PDA to be connected by wire or wirelessly, an earphone to be connected by wire or wirelessly, and the like. The external input/output unit allows data transferred from such an external apparatus to be transmitted to each constituent element in the interior of the smart phone 500, and allows data in the interior of the smart phone 500 to be transferred to an external apparatus.

The GPS receiving unit 570, in accordance with an instruction of the main control unit 501, receives GPS signals sent from GPS satellites ST1 to STn, executes a positioning operation process based on the multiple GPS signals received, and detects the position of the smart phone 500 by the latitude, longitude and altitude. When the position information can be acquired from the wireless communication unit 510 or the external input/output unit 560 (for example, a wireless LAN), the GPS receiving unit 570 can detect the position using the position information.

The motion sensor unit 580 includes, for example, a three-axis acceleration sensor and the like, and detects the physical motion of the smart phone 500 in accordance with an instruction of the main control unit 501. The detection of the physical motion of the smart phone 500 leads to the detection of the moving direction and acceleration of the smart phone 500. This detection result is output to the main control unit 501.

The power unit 590 supplies the electric power stored in a battery (not shown in the figure), to each unit of the smart phone 500, in accordance with an instruction of the main control unit 501.

The main control unit 501, which includes a microprocessor, operates in accordance with the control program and control data stored in the storage unit 550, and integrally controls each unit of the smart phone 500. Further, the main control unit 501 has a mobile communication control function to control each unit of the communication system, and an application processing function, for performing a voice communication and a data communication through the wireless communication unit 510.

The main control unit 501 operates in accordance with the application software stored in the storage unit 550, and thereby, the application processing function is implemented. Examples of the application processing function include an infrared communication function to perform the data communication with a facing apparatus by controlling the external input/output unit 560, an e-mail function to perform the sending and receiving of an e-mail message, a Web browsing function to browse a Web page, a function to generate a 3D image from a 2D image according to the present invention, and the like.

Further, the main control unit 501 has an image processing function such as the display of a picture to the display/input unit 520, based on image data (still image or moving image data) such as received data or downloaded streaming data. The image processing function is a function by which the main control unit 501 decodes the above image data, performs an image process to the decoded result, and displays the image to the display/input unit 520.

Moreover, the main control unit 501 executes the display control to the display panel 521, and the operation detection control for detecting a user operation through the operation unit 540 or the operation panel 522.

By the execution of the display control, the main control unit 501 displays software keys such as an icon for activating application software and a scroll bar, or displays a window for composing an e-mail message. Here, the scroll bar is a software key for receiving an instruction to move the display part of an image that is too large to fit inside the display region of the display panel 521, or the like.

Further, by the execution of the operation detection control, the main control unit 501 detects a user operation through the operation unit 540, receives an operation to the above icon and an input of a character string to an input box of the above window, or receives a scroll request of the display image through the scroll bar.

Moreover, by the execution of the operation detection control, the main control unit 501 has an operation touch panel control function to decide whether the operation position to the operation panel 522 is the superposition part (display region) overlapping with the display panel 521 or, other than it, the outer edge part (non-display region) not overlapping with the display panel 521, and to control the sensitive region of the operation panel 522 and the display position of the software keys.

Further, the main control unit 501 can detect a gesture operation to the operation panel 522, and can execute a previously set function in response to the detected gesture operation. The gesture operation means not a conventional simple touch operation, but an operation to draw a track from at least one of multiple positions by drawing the track by a finger or the like, by designating multiple positions simultaneously, or by combining them.

The camera unit 541 is a digital camera that performs an electronic image-taking using an imaging element such as a CMOS (Complementary Metal Oxide Semiconductor) or a CCD (Charged-Coupled Device), and has a function equivalent to the function shown in the block diagram of FIG. 3. Further, by the control of the main control unit 501, the camera unit 541 can convert image data obtained by the imaging, into compressed image data such as JPEG (joint Photographic coding Experts Group), for example, and can record them in the storage unit 550, or output them through the external input/output unit 560 or the wireless communication unit 510. In the smart phone 500 shown in FIG. 17, the camera unit 541 is mounted on the same surface as the display/input unit 520. However, the mount position of the camera unit 541 is not limited to this, and it may be mounted on the back surface of the display/input unit 520. Alternatively, multiple camera units 541 may be mounted. Here, in the case where the multiple camera units 541 are mounted, it is possible to switch a camera unit 541 to be used for an image taking to perform the image taking independently, and to use the multiple camera units 541 simultaneously to perform an image taking.

Further, the camera unit 541 can be utilized for various functions of the smart phone 500. For example, an image acquired by the camera unit 541 can be displayed on the display panel 521, and an image of the camera unit 541 can be utilized as one operation input of the operation panel 522. Further, when the GPS receiving unit 570 detects the position, it can detect the position by referring to an image from the camera unit 541. Moreover, by referring to an image from the camera unit 541, it is possible to decide the optical axis direction of the camera unit 541 of the smart phone 500, and to decide the current usage environment without using a three-axis acceleration sensor or using a three-axis acceleration sensor together. Naturally, it is possible to utilize an image from the camera unit 541 within the application software.

In addition, it is possible to add the position information acquired by the GPS receiving unit 570, the voice information acquired by the microphone 532 (it may be the text information after the voice-text conversion by the main control unit or the like), the attitude information acquired by the motion sensor unit 580, or the like, to image data of still image or moving image, to store them in the storage unit 550, and to output them through the external input/output unit 560 or the wireless communication unit 510.

[Addition]

In the embodiment, whether the subject color in the focus detection region is a red color is decided by whether the ratio ($\Sigma R/\Sigma G$) between the integrated value ($\Sigma R$) of the output signals of the R pixels in the focus detection region and the integrated value ($\Sigma G$) of the output signals of the G pixels is the previously set threshold value or more, but without being limited to this, may be decided, for example, by whether the average color of the focus detection region falls under the region of R in a color space, based on the average integrated value of the output signals of the R pixels in the focus detection region, the average integrated value of the output signals of the G pixels, and the average integrated value of the output signals of the B pixels.

Further, the present invention can be limited to the above-described embodiments, and various modifications are possible in a range without departing from the spirit of the invention.

What is claimed is:

1. An imaging device comprising:
   an image-taking lens;
   an imaging element including at least red (R), green (G) and blue (B) pixels, and first and second phase-difference pixels on which subject images having passed through first and second regions are pupil-divided and are formed respectively, and having a first B pixel and a second B pixel, the first and second regions being different regions on the image-taking lens, the first B pixel being adjacent in a first direction to a first R pixel of the R pixels at a minimum pitch, the second B pixel being adjacent in a second direction to a second R pixel of the R pixels, the second direction being opposite to the first direction;
   a decision unit to decide whether a subject color in a focus detection region is a red color, based on an output signal of the focus detection region, the focus detection region being set in the imaging element;
   a phase-difference detection unit to detect a phase difference between respective output signals of the first and second phase-difference pixels in the focus detection region, based on the respective output signals, when the decision unit decides that the subject color in the focus detection region is not a red color, and to detect a phase difference between respective output signals of the first and second B pixels in the focus detection region, based on the respective output signals, when the decision unit decides that the subject color in the focus detection region is a red color; and
   a focus adjustment unit to adjust a focal position of the image-taking lens, based on the phase difference detected by the phase-difference detection unit.

2. The imaging device according to claim 1,
   wherein the decision unit calculates a ratio between an integrated value of output signals of R pixels and an integrated value of output signals of G pixels in a previously set focus detection region of the imaging element, and decides that the subject color in the focus detection region is a red color, by comparing the calculated ratio with a previously set threshold value.

3. The imaging device according to claim 1,
   wherein each of the first and second phase-difference pixels is a pixel on which a filter of G or a colorless filter is arranged.

4. The imaging device according to claim 1,
   wherein the first B pixel and the second B pixel are alternately arrayed on a single line that is in the first direction, and
   the phase-difference detection unit
   detects a first phase difference, based on the output signal of the first B pixel arrayed on a first line that is in the first direction, and the output signal of the second B pixel provided on a second line that is close to the first line,
   detects a second phase difference, based on the output signal of the second B pixel arrayed on the first line that is in the first direction, and the output signal of the first B pixel provided on the second line, and
   detects the phase difference by averaging the detected first and second phase differences.

5. The imaging device according to claim 1,
   wherein the first phase-difference pixel and the second phase-difference pixel are alternately arrayed on a single line that is in the first direction, and
   the phase-difference detection unit
   detects a third phase difference, based on the output signal of the first phase-difference pixel arrayed on a third line that is in the first direction, and the output signal of the second phase-difference pixel provided on a fourth line that is close to the third line,
   detects a fourth phase difference, based on the output signal of the second phase-difference pixel arrayed on the third line that is in the first direction, and the output signal of the first phase-difference pixel provided on the fourth line, and
   detects the phase difference by averaging the detected third and fourth phase differences.

6. The imaging device according to claim 4, comprising:
   a rolling reading unit to sequentially read signals for each line of the imaging element; and
   a mechanical shutter to block light that enters the imaging element,
   wherein the phase-difference detection unit continuously detects the phase difference, based on signals that the rolling reading unit continuously reads in a state in which the mechanical shutter is opened.

7. The imaging device according to claim 1, comprising
   a defocus amount calculation unit to determine a defocus amount of the image-taking lens, based on the phase difference detected by the phase difference detection unit, and a rate of color mixing from a peripheral pixel to at least one phase-difference pixel of the first and second phase-difference pixels,
   wherein the focus adjustment unit moves the image-taking lens to such a position that the defocus amount determined by the defocus amount calculation unit is zero.

8. The imaging device according to claim 1,
   wherein the phase-difference detection unit
   corrects the output signal of at least one phase-difference pixel of the first and second phase-difference pixels, based on a rate of color mixing from a peripheral pixel to the at least one phase-difference pixel of the first and second phase-difference pixels, and an output signal of the peripheral pixel, and detects the phase difference, based on the output signals of the first and second phase-difference pixels after the correction.

9. The imaging device according to claim 7, wherein an R pixel is arranged so as to be adjacent in the first direction to the at least one phase-difference pixel of the first and second phase-difference pixels, and the rate of the color mixing from the peripheral pixel is a rate of color mixing from the R pixel to the phase-difference pixel to which the R pixel is arranged so as to be adjacent in the first direction.

10. The imaging device according to claim 9, wherein the phase-difference detection unit determines the rate of the color mixing from the peripheral pixel, based on a ratio between the output signal of the first B pixel and the output signal of the second B pixel.

11. The imaging device according to claim 1, wherein the imaging element has the first and second B pixels in the first and second directions, and has the first and second B pixels in third and fourth directions perpendicular to the first and second directions, and the phase-difference detection unit detects the phase difference, based on the output signals of the first and second B pixels in the first and second directions or the first and second B pixels in the third and fourth directions.

12. The imaging device according to claim 11, wherein the first and second directions are left-right directions when a body of the imaging device is horizontally held, the imaging device comprises a longitudinal/lateral image-taking detection unit to detect whether an image-taking is a lateral image-taking or a longitudinal image-taking, and the phase-difference detection unit detects the phase difference based on the output signals of the first and second B pixels in the first and second directions, when the lateral image-taking is detected by the longitudinal/lateral image-taking detection unit, and detects the phase difference based on the output signals of the first and second B pixels in the third and fourth directions, when the longitudinal image-taking is detected by the longitudinal/lateral image-taking detection unit.

13. The imaging device according to claim 1, wherein the imaging element has at least one basic array pattern of color filters, the basic array pattern corresponding to 6×6 pixels in the first and second directions and in third and fourth directions perpendicular to the first and second directions and being repetitively provided in the first and second directions and in the third and fourth directions, the basic array pattern is configured such that a first array and a second array are arranged at diagonal positions to each other, the first array being an array that corresponds to 3×3 pixels and in which G filters are arranged at the center and the four corners, B filters are arranged at the top and bottom to the G filter at the center, and R filters are arranged at the left and right thereto, the second array being an array that corresponds to 3×3 pixels and in which G filters are arranged at the center and the four corners, R filters are arranged at the top and bottom to the G filter at the center, and B filters are arranged at the left and right thereto, and a pixel having the G filter at one of the four corners of the first or second array in the focus detection region of the imaging element is configured as the first or second phase-difference pixel, respectively.

14. An imaging device comprising:

an image-taking lens;

an imaging element including at least red (R), green (G) and blue (B) pixels, and first and second phase-difference pixels on which subject images having passed through first and second regions are pupil-divided and are formed respectively, and having a first B pixel and a second B pixel, the first and second regions being different regions on the image-taking lens, the first B pixel being adjacent in a first direction to a first R pixel of the R pixels at a minimum pitch, the second B pixel being adjacent in a second direction to a second R pixel of the R pixels, the second direction being opposite to the first direction, the imaging element arranging an R pixel such that the R pixel is adjacent in the first direction or the second direction to at least one phase-difference pixel of the first and second phase-difference pixels;

a phase-difference detection unit to detect a phase difference between respective output signals of the first and second phase-difference pixels in a focus detection region, based on the respective output signals, the focus detection region being set in the imaging element; and a focus adjustment unit to adjust a focal position of the image-taking lens, based in the phase difference output by the phase-difference detection unit, wherein the phase-difference detection unit determines a rate of color mixing from a peripheral pixel to the at least one phase-difference pixel of the first and second phase-difference pixels, based on at least one output signal of an output signal of the first B pixel and an output signal of the second B pixel, and corrects the output signal of the at least one phase-difference pixel of the first and second phase-difference pixels, based on the determined rate of the color mixing and an output signal of the peripheral pixel.

15. The imaging device according to claim 14, comprising a decision unit to decide whether a subject color in the focus detection region is a red color, based on an output signal of the focus detection region, wherein the phase-difference detection unit determines the rate of the color mixing from the peripheral pixel, from the at least one output signal of the output signal of the first B pixel and the output signal of the second B pixel, when the decision unit decides that the subject color in the focus detection region is a red color, corrects the output signal of the at least one phase-difference pixel of the first and second phase-difference pixels, based on the rate of the color mixing and the output signal of the peripheral pixel, and detects the phase difference, based on the output signals of the first and second phase-difference pixels after the correction.

16. An imaging device comprising:

an image-taking lens;

an imaging element including at least red (R), green (G) and blue (B) pixels, and first and second phase-difference pixels on which subject images having passed through first and second regions are pupil-divided and are formed respectively, and having a first B pixel and a second B pixel, the first and second regions being different regions on the image-taking lens, the first B pixel being adjacent in a first direction to a first R pixel of the R pixels at a minimum pitch, the second B pixel being adjacent in a second direction to a second R pixel of the R pixels, the second direction being opposite to the first direction, the imaging element arranging an R pixel such that the R pixel is adjacent in the first direction or the second direction to at least one phase-difference pixel of the first and second phase-difference pixels;

a phase-difference detection unit to detect a phase difference between respective output signals of the first and second phase-difference pixels in a focus detection region, based on the respective output signals, the focus detection region being set in the imaging element;

a defocus amount calculation unit to determine a defocus amount of the image-taking lens, based on the phase difference detected by the phase difference detection unit, and a rate of color mixing from a peripheral pixel to the at least one phase-difference pixel of the first and second phase-difference pixels; and a focus adjustment unit to move the image-taking lens to such a position that the defocus amount determined by the defocus amount calculation unit is zero, wherein the phase-difference detection unit determines the rate of the color mixing from the peripheral pixel, based on at least one output signal of the output signal of the first B pixel and the output signal of the second B pixel.

17. The imaging device according to claim 16, comprising a decision unit to decide whether a subject color in the focus detection region is a red color, based on an output signal of the focus detection region, wherein the phase-difference detection unit determines the rate of the color mixing from the peripheral pixel, from the at least one output signal of the output signal of the first B pixel and the output signal of the second B pixel, when the decision unit decides that the subject color in the focus detection region is a red color, and the defocus amount calculation unit determines the defocus amount of the image-taking lens, based on the phase difference detected by the phase-difference detection unit, and the rate of the color mixing from the peripheral pixel.

18. An automatic focus adjustment method comprising:

a signal acquisition step of acquiring an output signal from an imaging element, the imaging element including at least red (R), green (G) and blue (B) pixels, and first and second phase-difference pixels on which subject images having passed through first and second regions are pupil-divided and are formed respectively, and having a first B pixel and a second B pixel, the first and second regions being different regions on an image-taking lens, the first B pixel being adjacent in a first direction to a first R pixel of the R pixels at a minimum pitch, the second B pixel being adjacent in a second direction to a second R pixel of the R pixels, the second direction being opposite to the first direction;

a decision step of deciding whether a subject color in a focus detection region is a red color, based on an output signal of the focus detection region, the focus detection region being set in the imaging element, the output signal of the focus detection region being of the output signal acquired in the signal acquisition step;

a phase-difference detection step of detecting a phase difference between respective output signals of the first and second phase-difference pixels in the focus detection region, based on the respective output signals, when a decision that the subject color in the focus detection region is not a red color is made in the decision step, and detecting a phase difference between respective output signals of the first and second B pixels in the focus detection region, based on the respective output signals, when a decision that the subject color in the focus detection region is a red color is made in the decision step; and a focus adjustment step of adjusting a focal position of the image-taking lens, based on the phase difference detected in the phase-difference detection step.

* * * * *